(12) United States Patent
Omran et al.

(10) Patent No.: US 12,312,699 B1
(45) Date of Patent: May 27, 2025

(54) BORON-DOPED $Ag_2WO_4$ NANOPARTICLES FOR WATER ELECTROLYSIS

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Mohamed Mokhtar Mohamed, Riyadh (SA); Salah Ahmed Ibrahim Eid, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/931,861

(22) Filed: Oct. 30, 2024

(51) Int. Cl.
| | |
|---|---|
| *C25B 11/077* | (2021.01) |
| *C25B 1/04* | (2021.01) |
| *C25B 11/037* | (2021.01) |
| *C25B 11/052* | (2021.01) |
| *C25B 11/093* | (2021.01) |

(52) U.S. Cl.
CPC .......... *C25B 11/077* (2021.01); *C25B 1/04* (2013.01); *C25B 11/037* (2021.01); *C25B 11/052* (2021.01); *C25B 11/093* (2021.01)

(58) Field of Classification Search
None
See application file for complete search history.

(56) References Cited

FOREIGN PATENT DOCUMENTS

| CN | 108855143 A | 11/2018 |
| CN | 113774403 A | 12/2021 |
| CN | 116575067 A | 8/2023 |

OTHER PUBLICATIONS

Khairy, M. et al "Surfactant-Assisted synthesis of α-and β-Ag2WO4 modified with Sulphur, Phosphorus, and boron and their application in wastewater elimination" Journal of Photochemistry and Photobiology, A: Chemistry, 450 (2024) 115458. (Year: 2024).*

(Continued)

*Primary Examiner* — Brian W Cohen
(74) *Attorney, Agent, or Firm* — Oblon, McClelland, Maier & Neustadt, L.L.P.

(57) ABSTRACT

A method for water electrolysis includes applying a voltage to an aqueous solution in an electrochemical cell, which includes a working electrode that is at least partially coated with a catalyst composition including boron-doped $Ag_2WO_4$ nanoparticles. The amount of boron present in the boron-doped $Ag_2WO_4$ nanoparticles ranges from 5% to 35% of the total weight of the boron-doped $Ag_2WO_4$ nanoparticles. Further, during the application of voltage, hydrogen evolves from the aqueous solution due to a hydrogen evolution reaction and oxygen evolves from the aqueous solution due to an oxygen evolution reaction. The working electrode during the application of voltage has an overpotential of less than or equal to 500 millivolts (mV) at a current density of 10 milli Ampere per square centimeter ($mA \cdot cm^{-2}$) for the oxygen evolution reaction.

20 Claims, 15 Drawing Sheets

(56) References Cited

OTHER PUBLICATIONS

Mohamed, M. et al "Phosphorus, boron and sulphur-doped silver tungstate-based nanomaterials towards electrochemical methanol oxidation and water splitting energy applications" International Journal of Hydrogen Energy, 50 (2024) 1232-1245. (Year: 2023).*

Mohammed S. Hameed, et al., "Assembly of 2D/2D Bi2WOβ/Boron-doped g-C3N4 Z-type heterojunction photocatalysts for efficient antibiotic adsorption and degradation", Materials Science in Semiconductor Processing, vol. 180, Sep. 2024, (6 pages).

E. Mustafa, et al., "Efficient CuO/Ag2WO4 photoelectrodes for photoelectrochemical water splitting using solar visible radiation", RSC Advances, vol. 13, 2023 (14 pages).

Md Ahasan Habib, et al., "Design of boron-based ternary W3CoB3 electrocatalyst for the improved HER and OER performances", Materials Today Energy, vol. 26, Jun. 2022 (6 pages).

\* cited by examiner

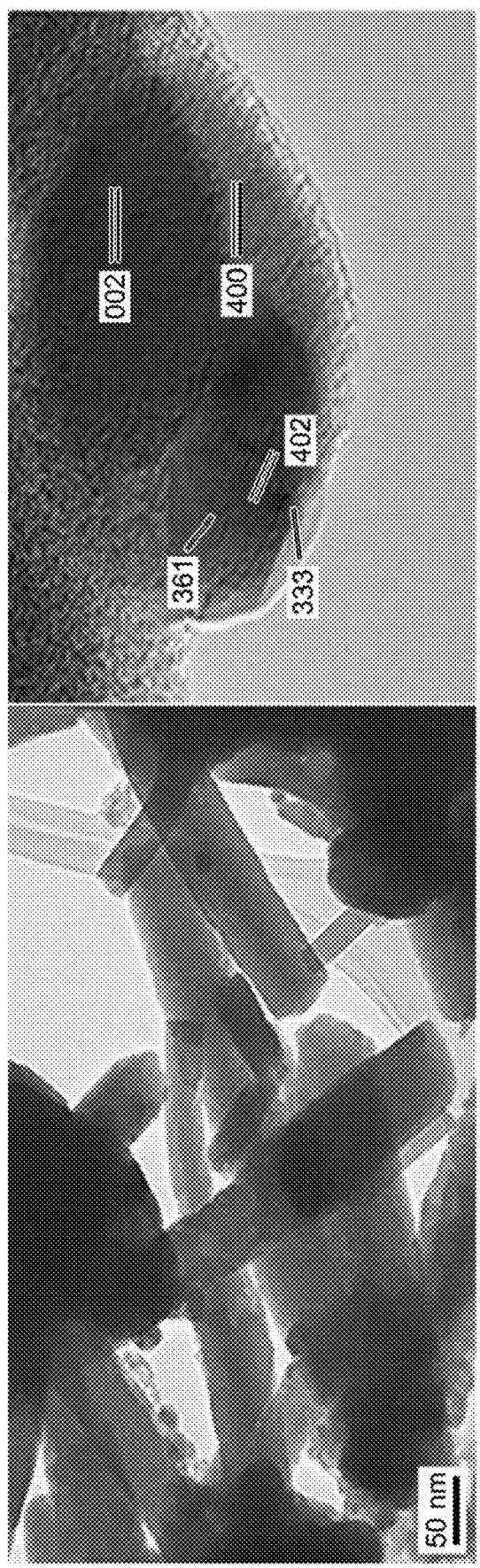

BORON-DOPED $Ag_2WO_4$ NANOPARTICLES FOR WATER ELECTROLYSIS

STATEMENT REGARDING PRIOR DISCLOSURE BY THE INVENTORS

Aspects of the present disclosure are described in Khairy, M., et. al, "Surfactant-Assisted synthesis of α- and β-$Ag_2WO_4$ modified with Sulphur, Phosphorous, and boron and their applications in wastewater elimination" Journal of Photochemistry & Photobiology, A: Chemistry, Volume 450, 2024, which is incorporated herein by reference in its entirety. Aspects of the present disclosure are described in Mohamed, M., et. al, "Phosphorous, boron and sulphury-doped silver tungstate-based nanomaterials toward electrochemical methanol oxidation and water splitting energy applications" International Journal of Hydrogen Energy, Volume 50, 2023, which is incorporated herein by reference in its entirety.

BACKGROUND

Technical Field

The present disclosure is directed to water-splitting techniques and, more particularly, directed toward a method and system for water electrolysis using boron-doped $Ag_2WO_4$ nanoparticles.

Description of Related Art

With the global population increase, clean energy has been in high demand. Presently, multiple clean energy sources exist. However, hydrogen is considered a valuable alternative to traditional fossil fuels. In particular, water splitting for hydrogen production has the potential to enhance the sustainability of energy storage, provided the process exhibits high-density hydrogen production, acts as a pure energy carrier, and has a low energy barrier. Water splitting is caused by two simultaneous events, namely an oxygen evolution reaction (OER) and a hydrogen evolution reaction (HER), which have different kinetics regarding the energy required for activation. The process of OER is energy-consuming, which diminishes the overall efficiency of water splitting. Thus far, the production of hydrogen through the process of water splitting has been constrained.

Silver-based semiconductors are highly effective in improving the performance of photoelectrochemical (PEC) water-splitting, along with other metal oxides. The process of applying silver tungstate ($Ag_2WO_4$) nanoparticles onto semiconductors made of metal oxide using a sequential ionic layer adsorption and reaction (SILAR) approach with different cycles has been used traditionally. This method has enhanced efficiency but still falls short of the anticipated photocurrent density. Iridium (Ir) and Ruthenium (Ru) are considered noble metals. They are highly effective catalysts for the oxygen evolution reaction (OER), while Platinum (Pt) is the preferred catalyst for the hydrogen evolution reaction (HER). Nevertheless, the limited availability and exorbitant cost of precious metals make them unsuitable for widespread utilization. Consequently, a comprehensive inquiry has been conducted to develop inexpensive, highly efficient electrocatalysts that possess comparable activity to the expensive ones. Consequently, further research has been conducted on the activities of materials based on α-$Ag_2WO_4$, such as adsorption, photoluminescence, and electrochemical sensing. However, the limited ability to capture visible light, reduced capacity to collect sunlight, and the hindered separation between charge carriers have limited the progress made in the field of photocatalysis, with the exception of studies conducted using UV irradiation. Hence, a need arises for a better, more efficient water-splitting process.

Each of the publications suffers from one or more drawbacks hindering their adoption. Accordingly, one object of the present disclosure is to provide a method for water electrolysis that may circumvent the above-stated limitations.

SUMMARY

In an exemplary embodiment, a method for water electrolysis is described. The method includes applying a voltage to an aqueous solution in an electrochemical cell including a working electrode at least partially coated with a catalyst composition including boron-doped $Ag_2WO_4$ nanoparticles. The amount of boron present in the boron-doped $Ag_2WO_4$ nanoparticles is in a range from 5% to 35% of the total weight of the boron-doped $Ag_2WO_4$ nanoparticles. Further, during the application, hydrogen evolves from the aqueous solution due to a hydrogen evolution reaction and oxygen evolves from the aqueous solution due to an oxygen evolution reaction. The working electrode during the application has an overpotential of less than or equal to 500 millivolts (mV) at a current density of 10 milli Ampere per square centimeter ($mA \cdot cm^{-2}$) for the oxygen evolution reaction.

In some embodiments, the amount of boron present in the boron-doped $Ag_2WO_4$ nanoparticles is in a range from 10% to 30% of the total weight of the boron-doped $Ag_2WO_4$ nanoparticles.

In some embodiments, the amount of boron present in the boron-doped $Ag_2WO_4$ nanoparticles is in a range from 15% to 25% of the total weight of the boron-doped $Ag_2WO_4$ nanoparticles.

In some embodiments, the boron-doped $Ag_2WO_4$ nanoparticles have α-$Ag_2WO_4$ and β-$Ag_2WO_4$ crystallites and the percentage of β-$Ag_2WO_4$ crystallites is in a range from 1% to 28% of the total number of crystallites.

In some embodiments, the percentage of β-$Ag_2WO_4$ crystallites is in a range from 6 to 23% of the total number of crystallites.

In some embodiments, the percentage of β-$Ag_2WO_4$ crystallites is in a range from 8% to 18% of the total number of crystallites.

In some embodiments, the working electrode during applying the voltage has an overpotential of less than or equal to 450 mV at a current density of 10 $mA \cdot cm^{-2}$ for the oxygen evolution reaction.

In some embodiments, the working electrode during applying the voltage has an overpotential of less than or equal to 425 mV at a current density of 10 $mA \cdot cm^{-2}$ for the oxygen evolution reaction.

In some embodiments, the working electrode during applying the voltage has an overpotential of less than or equal to −450 mV at a current density of 10 $mA \cdot cm^{-2}$ for the hydrogen evolution reaction.

In some embodiments, the working electrode during applying the voltage has an overpotential of less than or equal to −400 mV at a current density of 10 $mA \cdot cm^{-2}$ for the hydrogen evolution reaction.

In some embodiments, the working electrode during applying the voltage has an overpotential of less than or equal to −375 mV at a current density of 10 mA·cm$^{-2}$ for the hydrogen evolution reaction.

In some embodiments, the electro-chemical active surface area during applying the voltage is greater than or equal to 6 mF·cm$^{-2}$.

In some embodiments, the electro-chemical active surface area during applying the voltage is greater than or equal to 8 mF·cm$^{-2}$.

In some embodiments, the electro-chemical active surface area during applying the voltage is greater than or equal to 10 mF·cm$^{-2}$.

In some embodiments, the aqueous solution includes 5.0 M KOH.

In some embodiments, the anodic Tafel slope during applying the voltage is less than or equal to 100 mV/decade.

In some embodiments, the anodic Tafel slope during applying the voltage is less than or equal to 80 mV/decade.

In some embodiments, the anodic Tafel slope during applying the voltage is less than or equal to 50 mV/decade.

In some embodiments, the cathodic Tafel slope during applying the voltage is less than or equal to 120 mV/decade.

In some embodiments, the cathodic Tafel slope during applying the voltage is less than or equal to 114 mV/decade.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 2A is an optical image depicting transmission electron microscopy (TEM) results for AgW, according to certain embodiments.

FIG. 2B is an optical image depicting high resolution transmission electron microscopy (HRTEM) results for AgW, according to certain embodiments.

DETAILED DESCRIPTION

Figure 1:
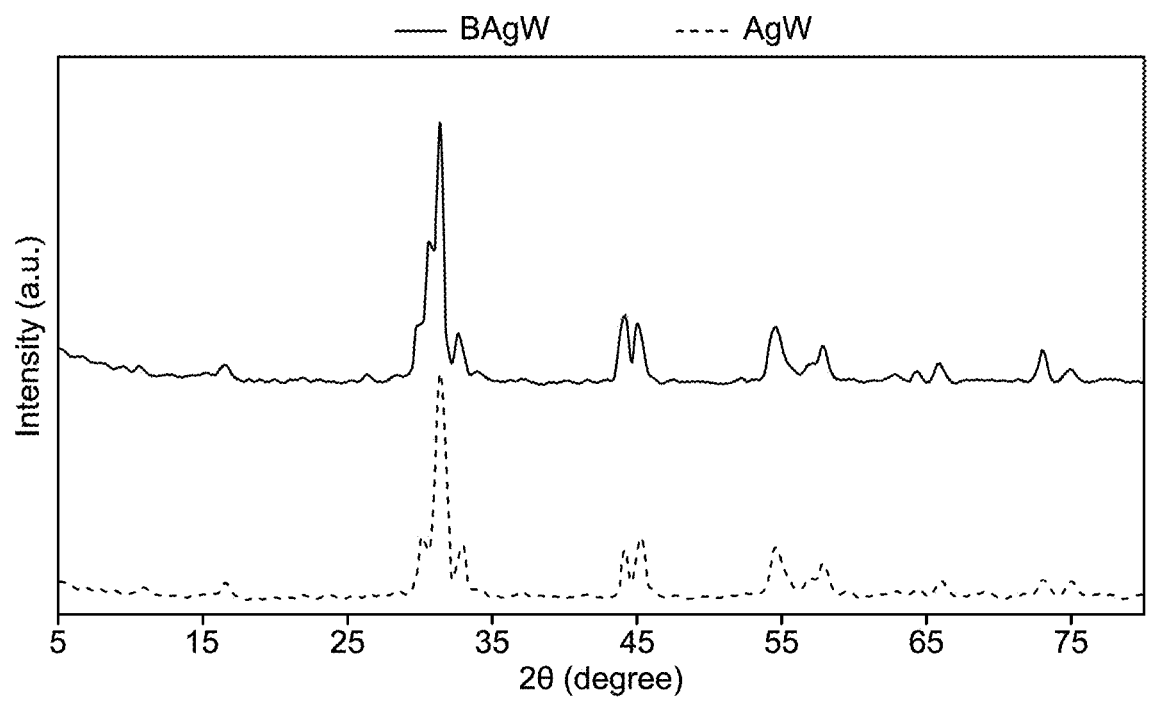
FIG. 1 is a graph depicting X-ray diffraction (XRD) patterns of silver tungstate (AgW) and boron doped AgW (B@AgW) samples, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "electrochemical cell" refers to a device that facilitates electrochemical reactions through the transfer of electrons between two electrodes immersed in an electrolyte solution. It typically consists of a cathode and an anode, separated by an electrolyte that conducts ions, allowing for charge balance during the reactions. In the context of water electrolysis, the electrochemical cell is designed to split water molecules into hydrogen and oxygen gases by applying an external voltage, driving the oxidation and reduction reactions at the respective electrodes.

As used herein, the term "water electrolysis" refers to the process of using electrical energy to drive the chemical reaction that splits water ($H_2O$) into its constituent gases, hydrogen ($H_2$) and oxygen (O2). This process occurs in an electrochemical cell, where an external voltage is applied to electrodes submerged in an electrolyte solution. At the anode, oxidation reactions take place, generating oxygen gas and releasing electrons, while at the cathode, reduction reactions occur, producing hydrogen gas as electrons are consumed. Water electrolysis is an industrially relevant method for hydrogen production and is highly valued for applications in renewable energy, fuel cells, and energy storage, as it allows for the conversion of surplus electrical energy into chemical energy in the form of hydrogen.

As used herein, the term 'current density' refers to the amount of electric current flowing per unit area of a conductor or surface. It is typically expressed in units of amperes per square meter ($A/m^2$).

As used herein, the term 'electro-chemical active surface area' refers to the surface area of an electrode that is available for electrochemical reactions. It is a useful parameter in evaluating the performance of catalysts and electrodes in electrochemical systems, such as batteries and fuel cells. ECSA is typically measured using techniques like cyclic voltammetry and is expressed in units such as square centimeters ($cm^2$) or square meters ($m^2$). A larger ECSA generally correlates with improved reaction rates and overall efficiency in electrochemical processes.

As used herein, the term "working electrode" refers to the electrode in an electrochemical cell where the primary electrochemical reactions occur, specifically during processes such as water electrolysis. It serves as the site for electron transfer, facilitating the oxidation and reduction reactions necessary for the conversion of water into hydrogen and oxygen gases. The working electrode can be composed of various conductive materials and is often coated with a catalyst to enhance its performance. In the context of water electrolysis, the working electrode plays a role in determining the efficiency and kinetics of the reactions, influencing factors such as overpotential and current density. Optimizing the design and material properties can improve the electrochemical processes involved, thereby affecting the overall performance of the electrochemical cell.

As used herein, the term "oxygen evolution reaction" (OER) refers to the electrochemical process in which water is oxidized to produce oxygen gas, along with protons and electrons. This reaction typically occurs at the anode of an electrochemical cell during water electrolysis. The OER is characterized by the transfer of electrons from water molecules, resulting in the formation of oxygen and the release of hydrogen ions into the solution. The OER is often associated with high overpotentials, making the development of effective catalysts useful for improving the reaction kinetics and overall energy efficiency of electrolysis systems.

As used herein, the term "hydrogen evolution reaction" (HER) refers to the electrochemical process in which protons ($H^+$) are reduced to form hydrogen gas ($H_2$). This reaction occurs at the cathode of an electrochemical cell during water electrolysis. In the context of water splitting, the HER is produces clean hydrogen fueland complements the oxygen evolution reaction (OER) that takes place at the anode. The HER involves the transfer of electrons to protons, leading to the formation of hydrogen molecules.

As used herein, the term "Tafel slope" refers to a parameter in electrochemistry that quantifies the relationship between the overpotential (the extra voltage needed beyond the equilibrium potential to drive a reaction) and the logarithm of the current density during an electrochemical reaction, such as the oxygen evolution reaction (OER) or hydrogen evolution reaction (HER). The Tafel slope is derived from the Tafel equation, which describes how the current density increases exponentially with overpotential. A lower Tafel slope indicates a more efficient reaction, as it suggests that less additional voltage is required to achieve higher current densities. The Tafel slope is typically expressed in millivolts per decade (mV/decade) and provides insights into the reaction mechanisms and kinetics at the electrode surface. By analyzing the Tafel slope, researchers can evaluate the effectiveness of catalysts and optimize conditions for enhanced electrochemical performance.

Aspects of this disclosure are directed to a method for water electrolysis using boron-doped $Ag_2WO_4$ nanoparticles. The method of present disclosure enhances the efficiency of both the oxygen evolution reaction (OER) and the hydrogen evolution reaction (HER), lowering the required overpotential. This results in improved energy conversion rates and faster production of hydrogen and oxygen gases. Additionally, the incorporation of boron doping enhances the stability and longevity of the catalyst, making the process more sustainable and cost-effective. Overall, this innovative approach not only advances the efficiency of water splitting but also promotes cleaner energy production, aligning with renewable energy goals.

A method for water electrolysis is described. The method includes applying a voltage to an aqueous solution in an electrochemical cell including a working electrode at least partially coated with a catalyst composition including boron-doped $Ag_2WO_4$ nanoparticles.

In some embodiments, the voltage applied may be 0.1 V to 5 V, 0.2 V to 2 V, 0.4 V to 1.5 V, 0.5 V to 1.0 V, 1.5 V to 2.0 V, and 1.75 V to 2.0V. In a preferred embodiment, the voltage applied is 1.44 V. The application of voltage initiates the oxidation and reduction processes at the electrodes. At the anode, water molecules are oxidized, leading to the evolution of oxygen gas and the release of protons ($H^+$ ions) through the oxygen evolution reaction (OER). Simultaneously, at the cathode, the protons migrate towards the electrode where they are reduced, combining with electrons to form hydrogen gas via the hydrogen evolution reaction (HER). During the application voltage, hydrogen evolves from the aqueous solution due to a hydrogen evolution reaction and oxygen evolves from the aqueous solution due to an oxygen evolution reaction.

The aqueous solution includes 5.0 M KOH. In some embodiments, the aqueous solution may have NaOH, LiGH, CsOH, $NH_4OH$, $Ca(OH)_2$, $Mg(OH)_2$, $Ba(OH)_2$, $K_2CO_3$, $Na_2CO_3$, $Li_2CO_3$, or combinations thereof. In some embodiments, the solution of aqueous solution may have concentration range from 0.5 M to 2.0 M, 1.0 M to 2.0 M, 2.0 M to 4.0 M, 3.0 M to 5.0 M, and 4.0M to 6.0 M. KOH, as a strong alkaline electrolyte, dissociates into potassium ions (K+) and hydroxide ions ($OH^-$) when dissolved in water. These hydroxide ions are facilitate the electrochemical reactions occurring at the electrodes. At the anode, the presence of $OH^-$ ions facilitates the oxidation of water, improving the rate of the oxygen evolution reaction (OER) by providing a readily available source of hydroxide for the formation of oxygen gas. Meanwhile, at the cathode, the high concentration of $OH^-$ ions aids in the reduction process during the hydrogen evolution reaction (HER), promoting the formation of hydrogen gas. The alkaline environment created by KOH not only enhances the overall conductivity of the solution but also stabilizes the reactive species involved in the electrolysis process. Moreover, the increased ionic strength and conductivity of the solution contribute to lower cell resistance, enabling the electrolysis to occur at lower voltages and reducing energy consumption. The aqueous solution may include other additives to enhance performance, and may include a mixture of bases and/taor electrolyte compounds.

In this water electrolysis setup, the working electrode facilitates the electrochemical reactions that convert water into hydrogen and oxygen gases. Typically composed of conductive materials like carbon or metals, the working electrode plays a role in electron transfer during the electrolysis process. The application of boron-doped $Ag_2WO_4$ nanoparticles as a coating enhances the electrode's catalytic activity, improving charge transfer and reducing the energy barrier for the reactions. The incorporation of boron not only stabilizes the catalyst but also optimizes its electronic properties, allowing for better interactions with water molecules. As voltage is applied, hydroxide ions from the alkaline electrolyte migrate towards the anode, where oxygen is produced, while hydrogen ions travel to the cathode, resulting in hydrogen generation. The structural and compositional features of the working electrode-such as high surface area and porosity-maximize reaction rates and overall efficiency, underscoring its importance in effective water splitting. Additionally, boron doping enhances the electronic characteristics of the $Ag_2WO_4$ nanoparticles, increasing their conductivity and creating more active sites for the reactions. This improvement lowers the activation energy required for water splitting, leading to enhanced reaction kinetics and allowing the process to occur more efficiently at reduced overpotentials. The effective conversion of water into hydrogen and oxygen not only contributes to clean energy production but also highlights the potential of this catalyst composition for practical applications in renewable energy technologies.

In some embodiments, the doping of boron onto $Ag_2WO_4$ may be achieved using various surfactants, including, but not limited to, sodium dodecyl sulfate (SDS), polyvinyl alcohol (PVA), Triton X-100, Tween 20, cetyl pyridinium chloride (CPC), polyethylene glycol (PEG), sorbitan monostearate (Span 60), hexadecyltrimethylammonium bromide (HTAB), octylphenol ethoxylate (OPE), and alkylbenzene sulfonic acid (ABS). In a preferred embodiment, boron is doped on $Ag_2WO_4$ in presence of the cationic surfactant cetyltrimethylammonium bromide (CTAB) ($C_{19}H_{42}NBr$). The surfactants can help stabilize the doped structure and enhance the properties of the resulting materials.

In the boron-doped $Ag_2WO_4$ nanoparticle catalyst composition, each component plays a role in boosting the efficiency of the electrolysis process. Silver (Ag) acts as the primary metal, enhancing overall conductivity and facilitating charge transfer during the electrochemical reactions. Its presence fosters a favorable environment for reactant molecule adsorption, thereby accelerating the kinetics of water splitting. Tungsten (W) maintains the structural integrity and stability of the catalyst, forming part of the tungstate framework that enhances its catalytic properties, including for the oxygen evolution reaction. The addition of boron modifies the electronic structure of the $Ag_2WO_4$ lattice, increasing the number of active sites available for reactions and lowering the activation energy needed for electrochemical processes. Furthermore, boron doping improves the catalyst's resistance to deactivation, extending its lifespan and performance in challenging electrolysis conditions. Collectively, these elements create a synergistic effect that optimizes catalyst efficiency, making it highly effective for water electrolysis applications.

In some embodiments, the amount of boron present in the boron-doped $Ag_2WO_4$ nanoparticles is in a range from 3 to 45%, preferably 5 to 35%, preferably 10 to 30%, preferably 15 to 25% of the total weight of the boron-doped $Ag_2WO_4$ nanoparticles. In a preferred embodiment, the amount of boron present in the boron-doped $Ag_2WO_4$ nanoparticles is about 20% of the total weight of the boron-doped $Ag_2WO_4$ nanoparticles.

The presence of both $\alpha$-$Ag_2WO_4$ and $\beta$-$Ag_2WO_4$ crystallites in boron-doped $Ag_2WO_4$ nanoparticles influences their catalytic properties and overall performance in water electrolysis. $\alpha$-$Ag_2WO_4$, offers enhanced electrical conductivity and favorable electronic characteristics, which facilitate charge transfer during the electrochemical reactions. Its unique crystal lattice also provides a rich array of active sites that are conducive to the adsorption of reactant molecules, thereby promoting efficient water splitting. Conversely, $\beta$-$Ag_2WO_4$ exhibits enhanced stability and durability under operational conditions, contributing to the long-term effectiveness of the catalyst. The combination of these two polymorphs creates a synergistic effect, where the high conductivity of $\alpha$-$Ag_2WO_4$ complements the stability of $\beta$-$Ag_2WO_4$, resulting in an overall enhancement of catalytic activity. Additionally, the presence of boron modifies the crystal structure and may influence the phase transition between these two forms, optimizing the material's electronic properties further. This dual crystallite composition not only facilitates better electron and ion transport but also aids in maintaining a balance between activity and stability, which enables efficient and sustainable hydrogen production through water electrolysis. Thus, the coexistence of $\alpha$- and $\beta$-$Ag_2WO_4$ crystallites in boron-doped nanoparticles plays a role in maximizing their performance as a catalyst in renewable energy applications.

In some embodiments, the boron-doped $Ag_2WO_4$ nanoparticles have $\alpha$-$Ag_2WO_4$ and $\beta$-$Ag_2WO_4$ crystallites and the percentage of $\beta$-$Ag_2WO_4$ crystallites may range from 1 to 28%, 6 to 23%, 8 to 18% of the total number of crystallites. In a preferred embodiment, the percentage of $\beta$-$Ag_2WO_4$ crystallites is 12.6% of the total number of crystallites. In some embodiments, the average crystallite size of boron-doped $Ag_2WO_4$ may be in range from 5-15 nm, preferably 7-13 nm, preferably 7-10 nm, more preferably about 7.2 nm, which is less than the average crystallite size of $Ag_2WO_4$ (10.2 nm).

In some embodiments, the boron-doped $Ag_2WO_4$ nanoparticles may exhibit a range of morphological shapes, including, but not limited to, nanocrystals, nanorectangles, nanotriangles, nanopentagons, nanohexagons, nanoprisms, nanodisks, nanocubes, nanoribbons, nanoblocks, nanobeads, nanoflakes, nanopowders, and nanoflowers, as well as mixtures thereof. In a preferred embodiment, the morphological structures of boron-doped $Ag_2WO_4$ nanoparticles show one or more of platelet-like, spherical-like, and/or rod-like structures.

In some embodiments, the boron-doped $Ag_2WO_4$ spherical nanostructures may have an average diameter of 20-40 nm, 25-35 nm, 30-40 nm, 30-50 nm, and more preferably 43.4 nm. In some embodiments, the rod structures may have a width of 10-60 nm, 20-50 nm, 25-35 nm, 40-60 nm, 40-70 nm, 60-70 nm, and more preferably 61.3 nm. In some embodiments, the rod structures may have a length of 50-100 nm, 60-120 nm, 80-120 nm, 140-150 nm, and more preferably 142.8 nm.

The working electrode facilitates the oxygen evolution reaction (OER) during water electrolysis, including when an overpotential is applied. Overpotential refers to the additional voltage required beyond the theoretical value to drive the electrochemical reaction at a desired rate. When this overpotential is applied to the working electrode, it provides the necessary energy to overcome various kinetic barriers associated with the OER, such as the activation energy needed for water oxidation. At the working electrode, water molecules are adsorbed and undergo electrochemical reactions, where they lose electrons and produce oxygen gas and hydroxide ions. The presence of a catalyst, like boron-doped $Ag_2WO_4$ nanoparticles, at the electrode surface lowers the overpotential by creating more active sites for the reaction and improving the electrode's intrinsic conductivity. When the overpotential is applied, the enhanced electric field at the electrode interface promotes rapid electron transfer, facilitating the cleavage of O—H bonds in water molecules. This process generates reactive intermediates, such as hydroxyl radicals, which can further oxidize to form $O_2$. In some embodiments, the working electrode om applying the voltage may have an overpotential of less than or equal to 500 mV, 450 mV, 425 mV at a current density of 10 milliamperes per square centimeter ($mA \cdot cm^{-2}$) for the oxygen evolution reaction. In a preferred embodiment, the working electrode during applying the voltage has an overpotential of less than or equal to 399 mV at a current density of 10 $mA \cdot cm^{-2}$ for the oxygen evolution reaction.

During the hydrogen evolution reaction (HER) in water electrolysis, the working electrode plays a role, including when an overpotential is applied. The overpotential, which is the additional voltage required beyond the thermodynamic potential, is necessary to drive the HER at a high rate. At the working electrode, where the reaction occurs, electrons are supplied to protons ($H^+$ ions) from the aqueous solution, facilitating their reduction to produce hydrogen gas ($H_2$). When overpotential is applied, it compensates for kinetic barriers, such as the activation energy needed for the reaction to proceed, thus accelerating the electron transfer processes. In some embodiments, the working electrode during applying the voltage may have an overpotential of less than or equal to −450 mV, −400 mV, −375 mV at a current density of 10 $mA \cdot cm^{-2}$ for the hydrogen evolution reaction. In a preferred embodiment, the working electrode during applying the voltage has an overpotential of −340 mV at a current density of 10 $mA \cdot cm^{-2}$ for the hydrogen evolution reaction.

Current density, defined as the electric current per unit area of the electrode, plays a role in the efficiency and kinetics during water electrolysis. It directly influences the rate of the electrochemical reactions occurring at the working electrode; higher current densities typically correspond to increased rates of oxygen and hydrogen production. However, elevated current densities can also lead to higher overpotentials, increased energy consumption, and potential electrode degradation. In some embodiments, the current density may be in a range from 2 to 50 $mA \cdot cm^{-2}$. In some embodiments, the current density may be 2 $mA \cdot cm^{-2}$, 4 $mA \cdot cm^{-2}$, 6 $mA \cdot cm^{-2}$, 8 $mA \cdot cm^{-2}$, 12 $mA \cdot cm^{-2}$, and 50 $mA \cdot cm^{-2}$. In a preferred embodiment, the current density is 10 $mA \cdot cm^2$.

The electrochemical active surface area (ECSA) plays a role in determining the efficiency and performance of electrocatalysts in reactions such as the oxygen evolution reaction (OER) and hydrogen evolution reaction (HER). A larger ECSA provides more active sites for the electrochemical reactions to occur, facilitating faster kinetics and enhancing overall reaction rates. This increased surface area enables better mass transport and improves the interaction between reactants and the catalyst, leading to lower overpotentials and higher current densities. In some embodiments, the electro-chemical active surface area during the applying is greater than or equal to 6 millifarads per square centimeter ($mF \cdot cm^{-2}$), 8 $mF \cdot cm^{-2}$ and 10 $mF \cdot cm^{-2}$. In a preferred embodiment, the electro-chemical active surface area during the applying is 11.9 $mF \cdot cm^{-2}$ for boron doped $Ag_2WO_4$ and 4.3 $mF \cdot cm^{-2}$ for $Ag_2WO_4$, suggesting a higher number of active sites in the boron doped $Ag_2WO_4$ for the electrochemical reactions to occur.

The anodic Tafel slope is associated with the reaction rate of the oxidation process at the anode, such as the formation of oxygen from water. A steep anodic Tafel slope indicates that the reaction rate is highly sensitive to changes in overpotential, suggesting that the rate-determining step involves a high activation barrier. Conversely, the cathodic Tafel slope relates to the reduction process occurring at the cathode, such as the generation of hydrogen from water. A lower cathodic Tafel slope suggests that the HER is more favorable and requires less overpotential for a given current density, indicating a more efficient reaction mechanism. The slopes can also indicate the type of reaction kinetics involved-whether they are controlled by charge transfer or mass transport processes. In some embodiments, the anodic Tafel slope is less than or equal to 100 mV/decade, 80 mV/decade, 50 mV/decade. In a preferred embodiment, the anodic Tafel slope is about 57.6 mV/decade during applying the voltage for B@AgW, which is somewhat lower than AgW (98.1 mV/dec). In some embodiments, the cathodic Tafel slope during the application of the voltage may be less than or equal to 120 mV/decade, 114 mV/decade. In a preferred embodiment, the cathodic Tafel slope during applying the voltage for B@AgW is 111.3 mV/dec, which is somewhat lower than AgW (117.4 mV/dec).

EXAMPLES

The following examples provide a method of water electrolysis. The examples are provided solely for illustration and are not to be construed as limitations of the present disclosure, as many variations thereof are possible without departing from the spirit and scope of the present disclosure.

Example 1: Synthesis of α-$Ag_2WO_4$ nanoparticles

The α-$Ag_2WO_4$ nanoparticles were manufactured by a precipitation route at 80° C. in the presence of the cationic surfactant cetyltrimethylammonium bromide (CTAB) ($C_{19}H_{42}NBr$). Initially, a solution A was formed by dissolving $6.5 \times 10^{-3}$ moles (mol) of silver nitrate ($AgNO_3$) in 30 milliliters (mL) of bi-distilled water. Further, a solution B was formed by dissolving $3.6 \times 10^{-3}$ mol of dihydrate sodium tungstate ($Na_2WO_4 \cdot 2H_2O$) and 0.7 grams (g) of CTAB in 40 mL of bi-distilled water. The solution B was heated under continuous stirring at 80 degrees Celsius (° C.). Furthermore, solution A of silver nitrate was added to solution B of sodium tungstate and stirred for 15 minutes (min) at 80° C. The precipitate was subsequently separated and rinsed multiple times with distilled water and ethanol to eliminate the $Na^+$ ions, $NO_3$ ions, and any remaining organic molecules. After 12 hours, the product was dried at 60° C. The sample was denoted as AgW.

Example 2: Synthesis of B-doped $Ag_2WO_4$

B-doped α-$Ag_2WO_4$ nanoparticles was created using the same procedure described for synthesizing the α-$Ag_2WO_4$, with the addition of boric acid to a 30 ml solution of sodium tungstate under continuous stirring at 80° C. in the presence of 0.7 g CTAB. $AgNO_3$ solution was added to the boric acid/sodium tungstate solution at 80° C. and agitated for 15 min to synthesize the 20% B@AgW photocatalyst. Further, after filtering and washing multiple times with distilled water and ethanol, the residue was dried for 12 hours at 60° C.

Example 3: Characterization

Referring to FIG. 1, a graph depicting X-ray diffraction (XRD) patterns of AgW is illustrated. Specifically, XRD was used to identify the crystalline states in each specimen studied, employing the JDX-8030 X-ray diffractometer, JEOL. Copper (Cu) filtered CuKα radiation of about 1.5418 angstrom (Å) powered at 45 kilovolts (kV) and 10 mA was used to run the patterns. The specimens were tested at ambient temperatures in a range of 2θ=5° to 80°. The Fourier transform infrared (FTIR) spectra of the specimens were evaluated using a KBr pellet on a Bruker-TENSOR Series-FTIR. The surface morphologies of the obtained samples were analyzed using a high resolution transmission electron microscopy (HRTEM). The binding energy values of the fabricated catalysts were determined using a KRATOS-AXIS DLD analyzer and adjusted with Cls (284.6 eV) after monochromatic aluminum-potassium K-alpha (Al-Kα) irradiation. Using a programmable inductance-capacitance-resistance (LCR) bridge (HIOKI: IM 3536), the electrical properties such as, residual current (RDC) and dielectric constant (ε') were assessed at fixed parameters including 1 V, 0 Hz, and 25° C. Further, a formula was used to determine the values for ε', the formula is provided hereinafter:

$$\varepsilon' = (C/\varepsilon_0) \times (t/A_s)$$

where 'C' is the equivalent capacitance, 't' is the specimen width, 'ε°' is the permittivity of vacuum, and '$A_s$' is the measuring area of the sample. Furthermore, energy dispersive X-ray (EDX) analysis was performed using an Oxford INCA X-Act. The EDX analysis was performed utilizing a line scan analysis approach.

Example 4: XRD

XRD was utilized to assess the crystal structure, size, and impact of the doping process on the crystal structure. The diffraction pattern of CTAB-assisting $Ag_2WO_4$ formation and the orthorhombic α-$Ag_2WO_4$ phase was discovered to exhibit the following crystallographic planes in CTAB assisting AgW; (JCPDS no. 034-0061): (110), (011), (002), (231), (400), (402), (361), (460), (333), (462), (633), and (404), indicating the formation of α-$Ag_2WO_4$. In addition, one more peak in the (042) plane is related to the phase of β-$Ag_2WO_4$ (JCPDS no. 33-1195). There are no peaks associated with silver nanoparticles, according to the XRD pattern of the CTAB-assisted formation sample. Benefiting from the Debye-Scherrer equation and the major peak of the plane (220), the crystallite sizes were determined to be 10.2 nanometers (nm). The doping of $Ag_2WO_4$ with Boron (B@AgW) exhibits the identical pattern with all previously mentioned planes indicative of the orthorhombic α-$Ag_2WO_4$ phase, as well as one peak with the (042) plane that is associated with β-$Ag_2WO_4$ (JCPDS no. 33-1195), as shown in FIG. 1. The latter peak represents 12.6% of the former one. The peak associated with the (002) plane appears to have merged with the primary peak of the (231) plane due to the doping with boron, and a tiny shift was also noticed to the lower 2θ angles which may be due to the interaction and incorporation of Boron within the tungstate structure. The crystallite size was decreased due to doping to 7.2 nm.

Example 5: Morphology Characteristics

The morphological structure of AgW revealed by TEM-HRTEM observations, shown in FIGS. 2A-2B, include nanorods with widths of 57.4 nm and lengths of 302.4 nm, as well as a few spherical particles with a 31.8 nm diameter. The nanorods show evidence of oriented growth, in which the individual particles are aligned. Thus, it may be hypothesized that CTAB surfactant may function as a particle transporter and a modifier during the creation process of $Ag_2WO_4$, resulting in the orientation growth of $Ag_2WO_4$ nanorods. The CTAB surfactant accelerates the reaction of the growth units and leads to their oriented growth. CTAB is an ionic compound that ionizes completely in water (CTAB→$CTA^+ + Br^-$). Since negative $WO_4^{-2}$ ions exist in the solution of $Na_2WO_4$, whereas $CTA^+$ is positively charged with a tetrahedral head and a long hydrophobic tail, the $CTA^+$-$WO_4^{-2}$ ion pairs are formed by electrostatic interaction. Adding $AgNO_3$ solution to the previously formed $CTA^+$-$WO_4^{-2}$ ion pairs form a combination of CTAB and $Ag_2WO_4$ according to the reaction:

$$CTA^+-[WO_4^{-2}]+2Ag^+ \rightarrow Ag_2WO_4 + CTA^+$$

The reaction as described above leads to the oriented $Ag_2WO_4$ growth, resulting in the nanorods. In agreement with the XRD results, the corresponding HR-TEM results show the presence of different fringes with varying spacings that correspond to the (002), (400), (361), (333), and (402) planes of α-$Ag_2WO_4$.

Figures 2C, 2D:
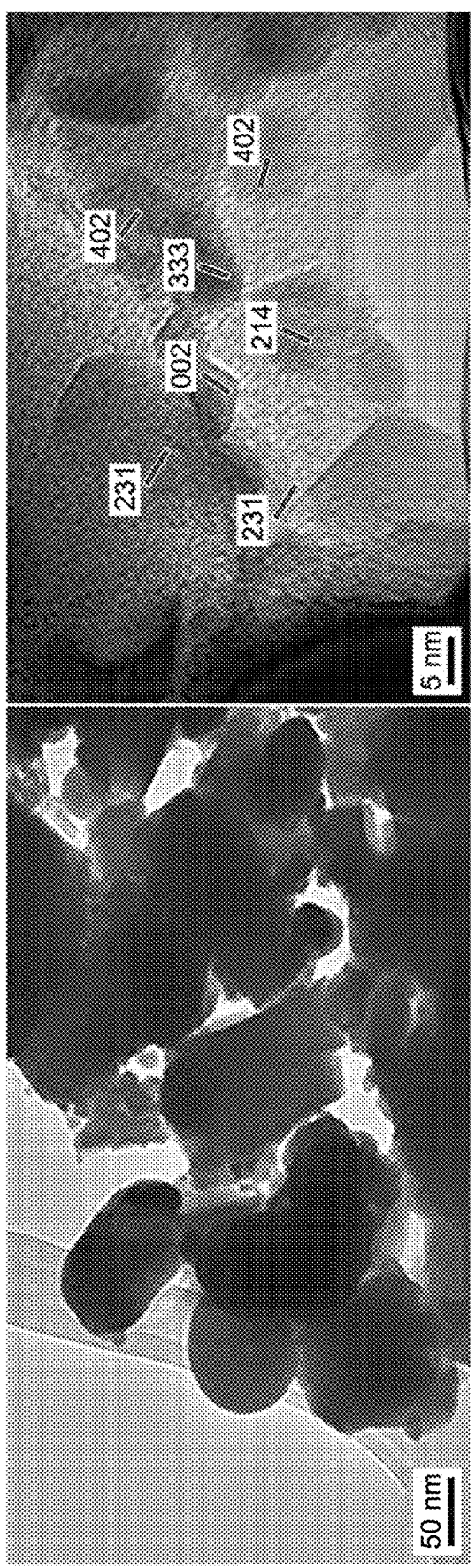
FIG. 2C is an optical image depicting TEM results for boron doped AgW (B@AgW), according to certain embodiments.
FIG. 2D is an optical image depicting HRTEM results for B@AgW, according to certain embodiments.

The morphological structures of AgW are affected by boron doping. It shows mixed platelet-like, spherical-like, and rod-like structures, as shown in FIGS. 2C-2D. The spherical nanostructures have an average diameter of 43.4 nm, while the rod structures have a width of 61.3 nm and a length of 142.8 nm. The HR-TEM reveals various lattice planes of (231), (002), (402), (333), and (214) for α-$Ag_2WO_4$. The TEM morphological images, which reveal size and shape changes after doping compared to the non-doped AgW sample, show that the doping method had a major effect on particle width and morphological forms. Due to the doped structure aggregation, B-doped $Ag_2WO_4$ had a wide range of pore apertures in the mesopore range.

Example 6: X-Ray Photoelectron Spectroscopy (XPS) Analysis

Figure 3A:
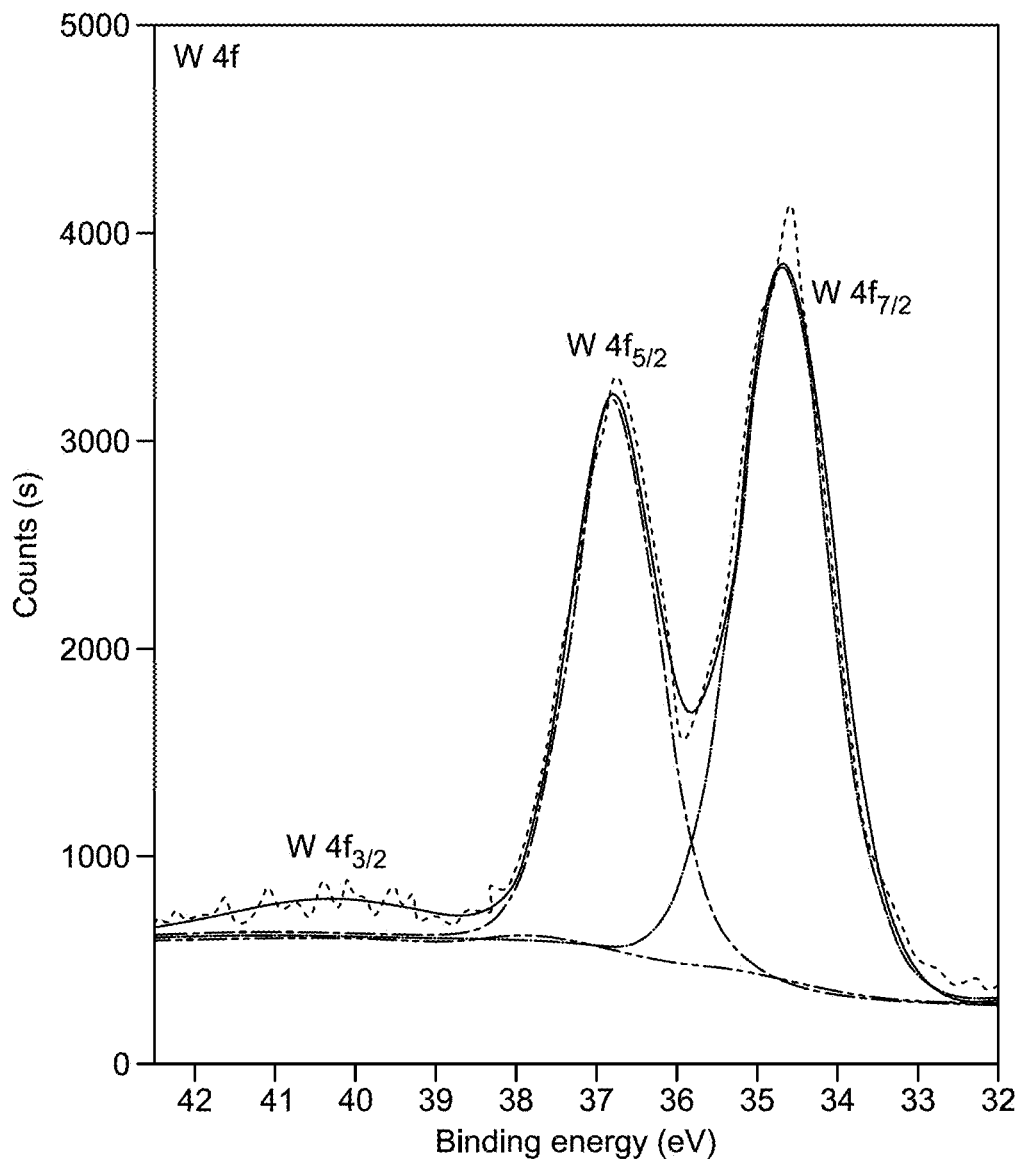
FIG. 3A is a graph depicting deconvoluted high resolution X-ray photoelectron spectroscopy (XPS) spectra of W4f of AgW, according to certain embodiments.
Figure 3B:
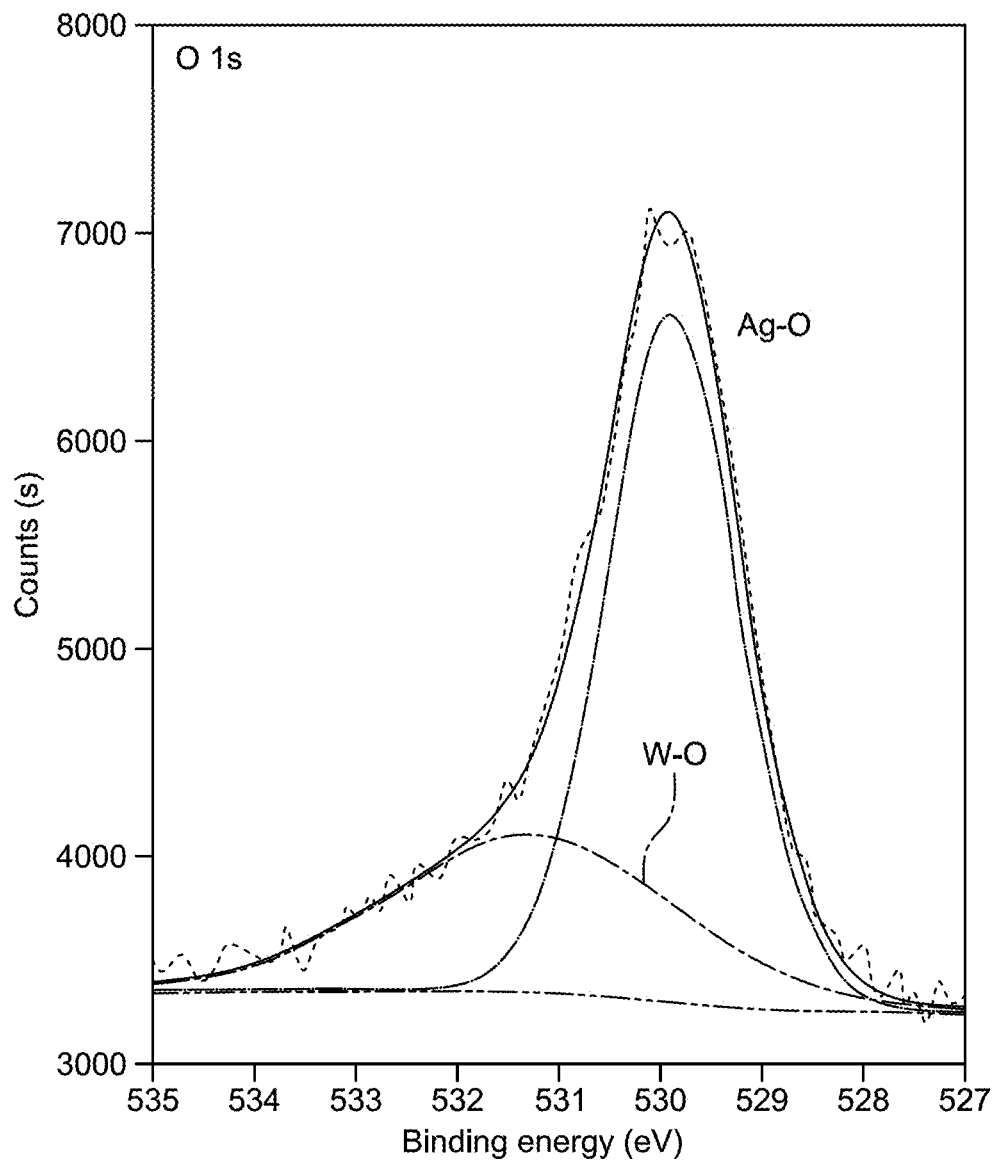
FIG. 3B depicts a deconvoluted high resolution XPS spectra of O1s of AgW, according to certain embodiments.
Figure 3C:
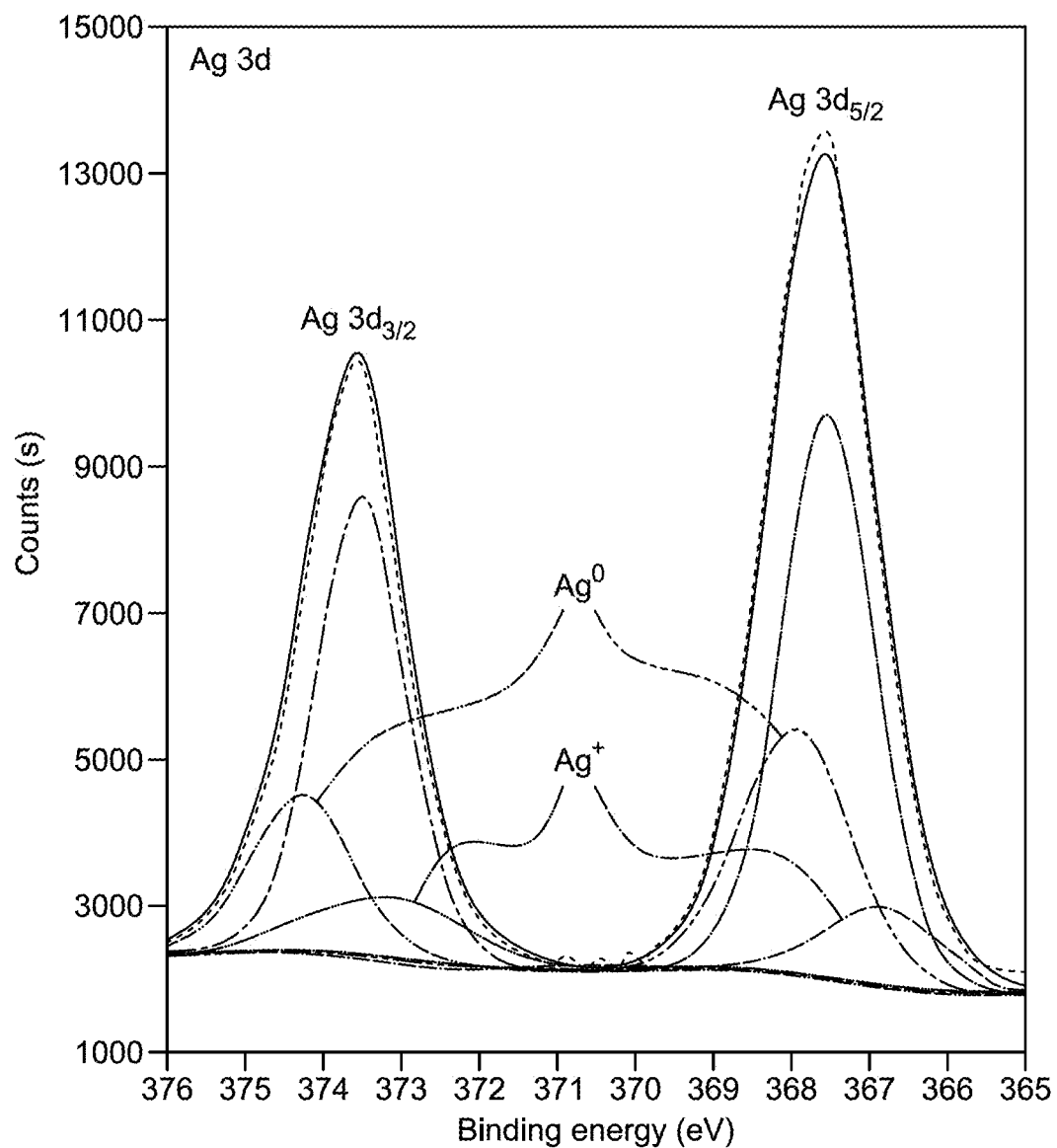
FIG. 3C depicts a deconvoluted high resolution XPS spectra of Ag3d of AgW, according to certain embodiments.

An XPS analysis assessed the chemical components of AgW and B-doped AgW samples. The peaks of Ag, W, and O are seen in the XPS spectra of α-$Ag_2WO_4$, as shown in FIGS. 3A-3C. Peaks at 34.8 electron volts (eV), 36.8 eV, and 40.2 eV associated with W4f 7/2, W4f 5/2, and W4f 3/2, respectively, are visible in the high-resolution W4f XPS spectra of the as-synthesized sample elaborating that $W^{6+}$ species may exist independently. Two peaks at 530.0 eV and 531.3 eV, which correspond to O1s generated via contacts with Ag—O and W—O, respectively, were seen in the deconvoluted XPS data for the O1s area, as shown in FIG. 3B. The occurrence of $Ag^+$ is indicated by the existence of two separate peaks in the Ag 3d spectra at 367.7 and 373.5 eV generated by Ag 3d5/2 and Ag 3d3/2. Results from deconvolution of the later peaks show that Ag nanoparticles are present, with a proportion of 31.1% relative to $Ag^+$, via peaks at 368.0 and 374.3 eV.

The XPS of the B@AgW sample is shown in FIGS. 4A-4D, depicting photoelectron peaks of the elements Ag, W, O, and B. As can be seen from FIG. 4A, the Ag 3d exhibits two peaks at 366.62 eV and 372.38 eV due to $Ag^+$ species that are analogous to those seen in AgW with a slight shift to higher binding energies, demonstrating the establishment of a robust heterojunction between AgW and B. Similarly, the Ag nanoparticles are signified by the two peaks at 368.07 eV and 373.65 eV. The amount of Ag in B@AgW was lower than that detected in AgW, which may be attributed to the presence of B, which constitutes 14.7%.

Figure 4A:
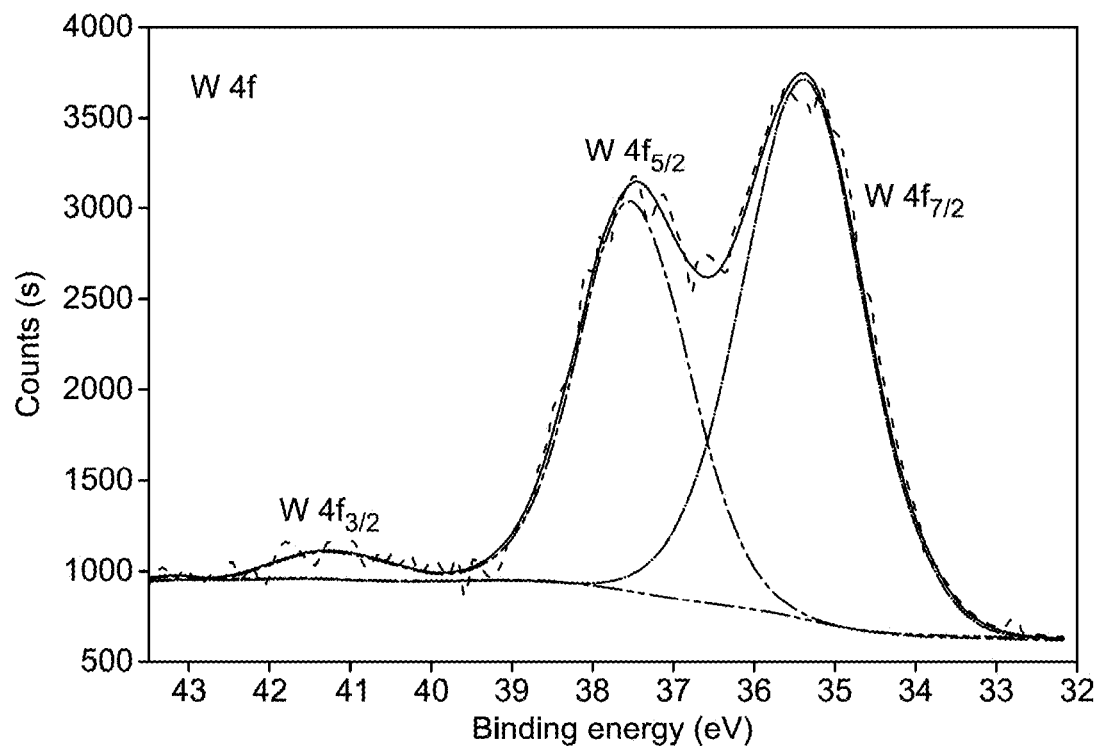
FIG. 4A depicts a deconvoluted high resolution XPS spectra of W4f of B@AgW, according to certain embodiments.
Figure 4B:
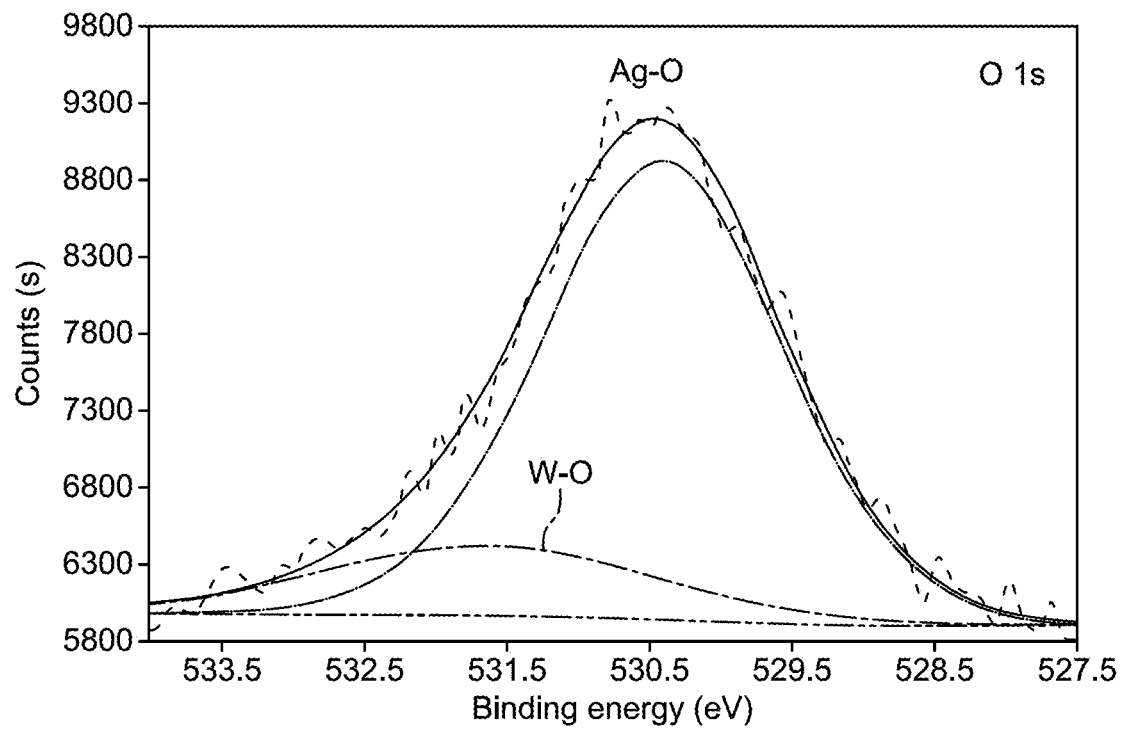
FIG. 4B is a graph depicting deconvoluted high resolution XPS spectra of O1s of B@AgW, according to certain embodiments.
Figure 4C:
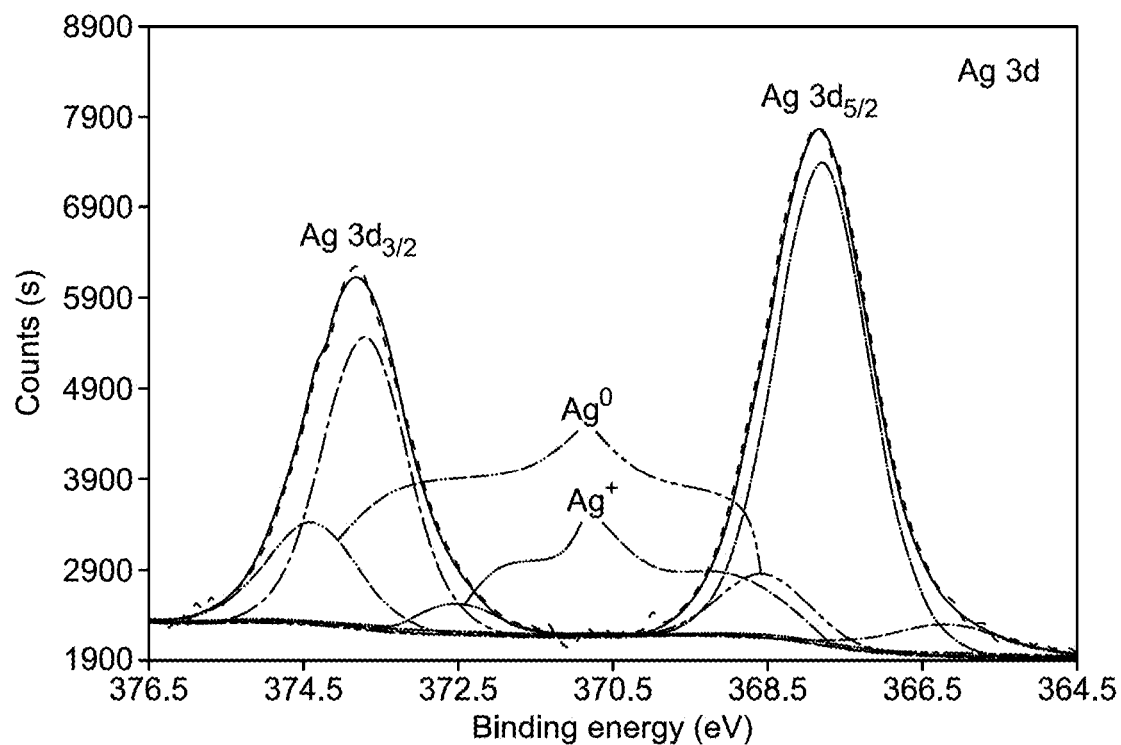
FIG. 4C depicts a deconvoluted high resolution XPS spectra of Ag3d of B@AgW, according to certain embodiments.
Figure 4D:
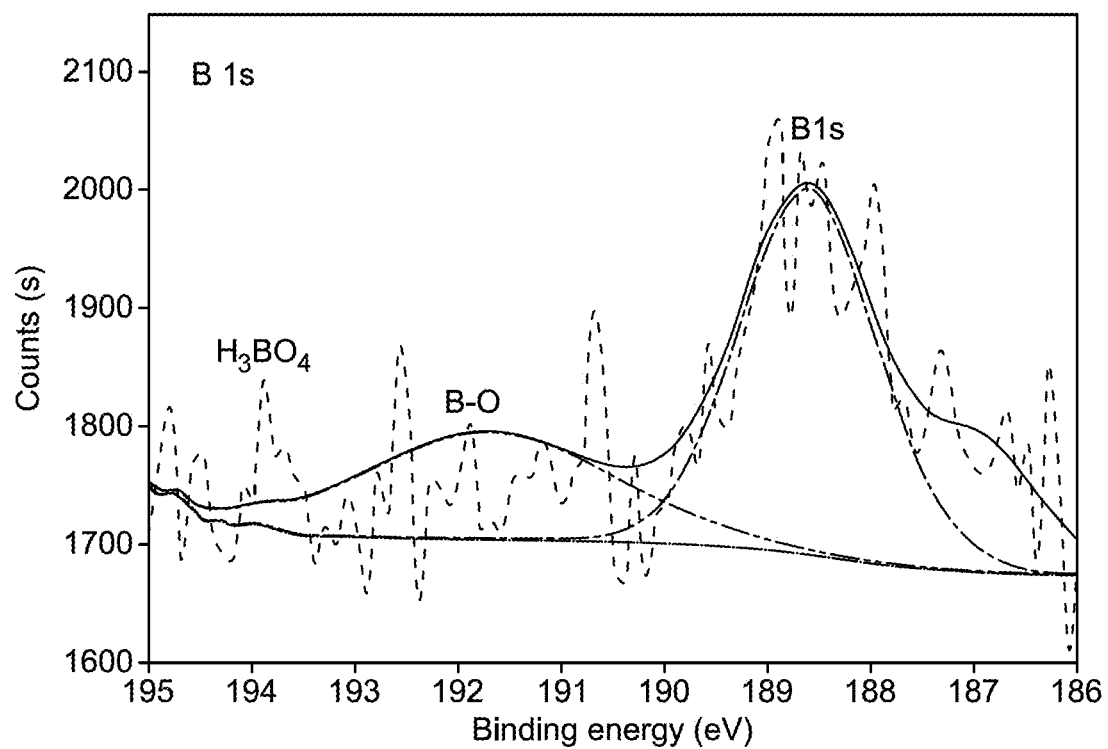
FIG. 4D depicts a deconvoluted high resolution XPS spectra of B2$p$ of B@AgW, according to certain embodiments.

Peaks attributed to $W^{6+}$ (35.37 eV, 37.52 eV, and 41.16 eV) are detected at greater binding energies compared to those observed for W in AgW (34.8, 36.8, and 40.2 eV), demonstrating the strong interaction between B and AgW. This high shift in BE suggests a considerable increase in the total electron density following B addition, so it is higher than that of AgW. In regards to the boron species, the B is peak at 188.4 eV, as shown in FIG. 4D, is attained in addition to providing evidence of the presence of B—O, $B_2O_3$, and $H_3BO_3$ species with maxima at 191.88 eV, 192.58 eV, and 194.78 eV respectively. This interaction is related to the synergistic effect with $B^{3+}$ species.

Example 7: Electrical Conductivity

Figure 5:
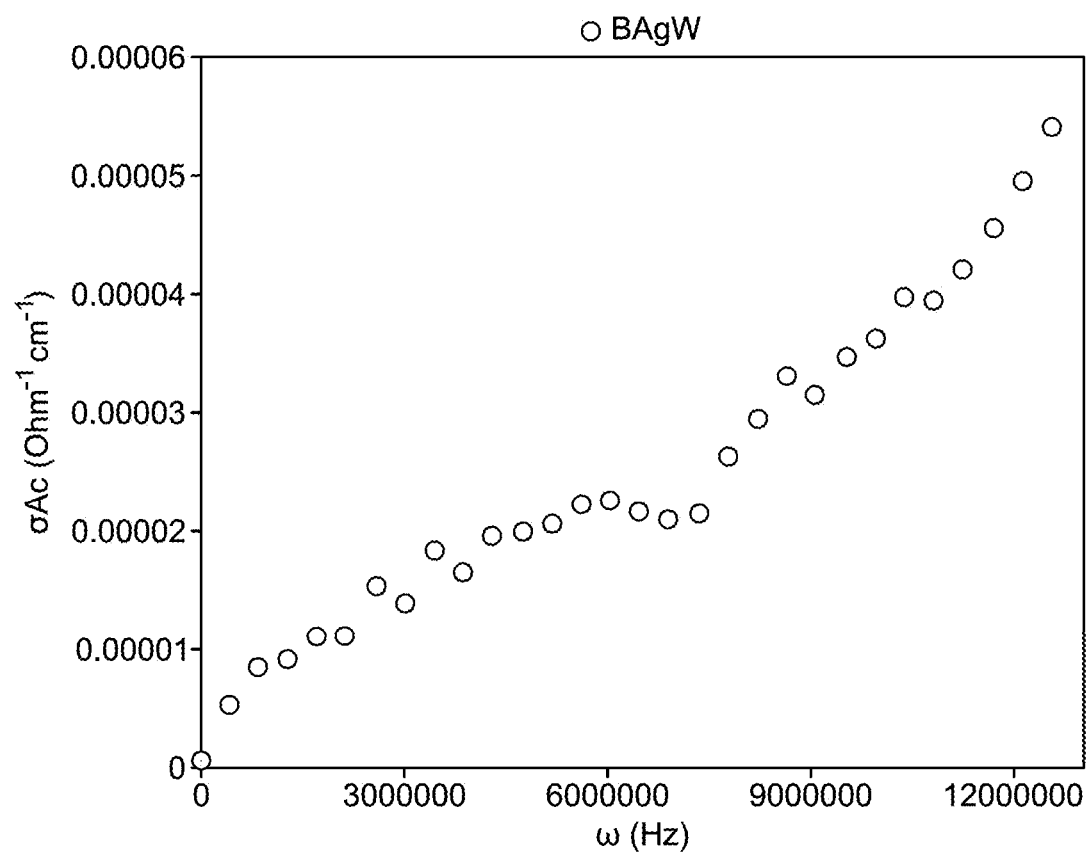
FIG. 5 is a graph depicting dependence of AC conductivity on frequency for B@AgW catalysts, according to certain embodiments.

Referring to FIG. 5, the electrical conductivity ($\sigma_{Ac}$) of AgW and B-doped AgW samples as a function of frequency was measured based on the following formula:

$$\sigma_{Ac} = \varepsilon' \varepsilon 0 \tan \delta.$$

where the angular frequency 'ω' is equivalent to 2πf, 'f' is the applied field frequency, 'ε" is the dielectric constant, '$\varepsilon_0$' is the permittivity of vacuum, and 'tan δ' is the loss tangent. The frequency-dependent rise in electrical conductivity, as shown in FIG. 5, indicates that both materials displayed semiconducting behavior. The release of charge carriers bound to certain sites, the impulse force from the applied field, and the boost in movement and transfer of the liberated charge carriers between various sites might all contribute to the rise in conductivity values at elevated frequencies. These liberated charge carriers help determine a material's conducting activity with electrons. The mobility of electrons among different metal ions and these released charge carriers may impact an ability of a material to conduct electricity. It was observed that the conductivity value of B-doped AgW sample decreased compared to undoped AgW at all frequencies, B@AgW ($8.4 \times 10^{-6}$ $ohm^{-1}$ $cm^{-1}$ at 140 kHz) < AgW ($1.5 \times 10^{-5}$ $ohm^{-1}$ $cm^{-1}$ at 140 kHz). The reduction in conductivity after doping may be caused by the compensation of the oxygen vacancy-related states compared to that in pure AgW. Doping with nonmetallic element causes the formation of a defect barrier at the grain border, which hinders the ability of the charge carrier to pass through the grain and raises its trapping states. Free carriers are eventually captured by trapping states and rendered stationary. The diffusion of p-type (Boron) in the bulk of AgW affected the conductivity, the p-type indicates minute conductivity.

Example 8: Fuel Cell Application

Voltametric experiments were made in a conventional three-electrode electrochemical system at a temperature of about 25° C. employing an auto-lab PGSTAT204 coupled to software named Nova 1.11 for processing the data. AgW and B@AgW electrodes with an area of 0.6 $cm^2$ were used as working electrodes. These electrodes were meticulously created by putting PVDF and carbon black onto FTO conductive glass in a proportion of 85:10:5. The electrochemical cell was filled with a 1.0 M solution of acidified (0.5 M $H_2SO_4$) $CH_3OH$, with or without the previously positioned electrodes. All potentials were denoted to the saturated Ag/AgCl electrode, which served as the reference electrode, and a thin platinum electrode, which functioned as the counter electrode. Unless otherwise specified, cyclic consequence sweeps were employed between 0.8 V and 1.3 V at a 10 mV $s^{-1}$ scan rate. The linear sweep voltammetry (LSV) experiment was conducted in the acidic aqueous solution at a scan rate of 10 mV $s^{-1}$. The acidic aqueous solution recorded the ampere-metric I-t curves at 0.2 V for 600 s. Electrochemical impedance spectroscopy (EIS) evolutions were carried out on the device mentioned, utilizing 10 mV amplitudes in the 100 kHz to 0.1 Hz frequency range.

Figure 6A:
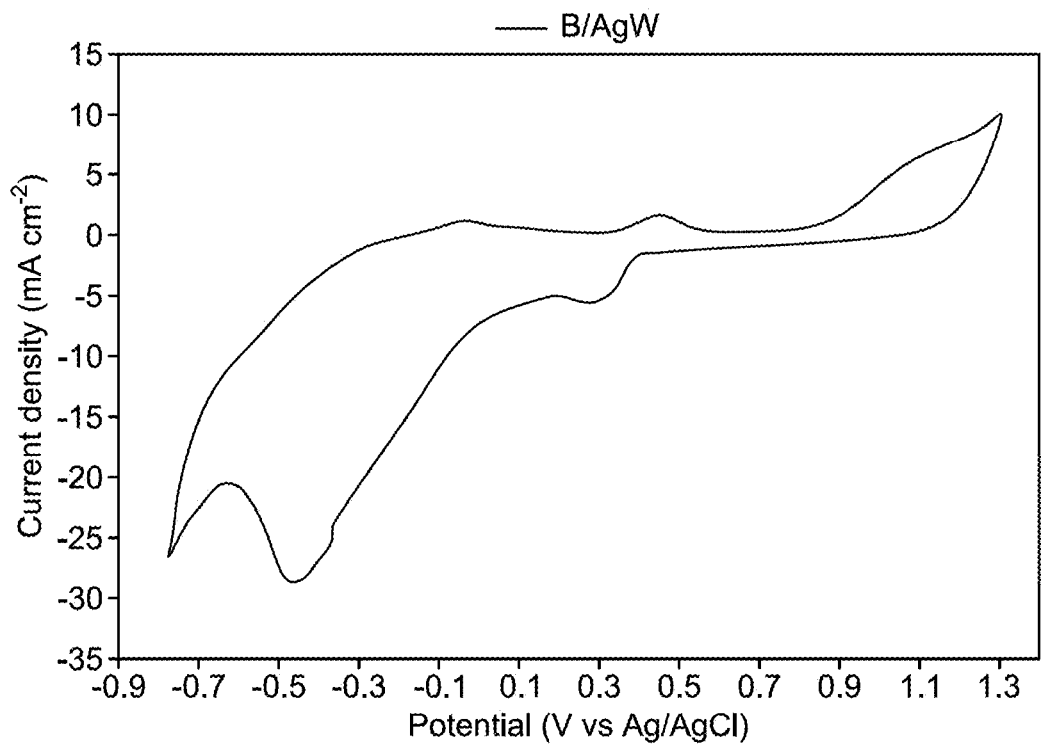
FIG. 6A depicts a cyclic voltammetry (CV) curve for B@AgW employing 0.5 molar (M) sulfuric acid electrolyte, in absence of methanol (MeOH), according to certain embodiments.
Figure 6B:
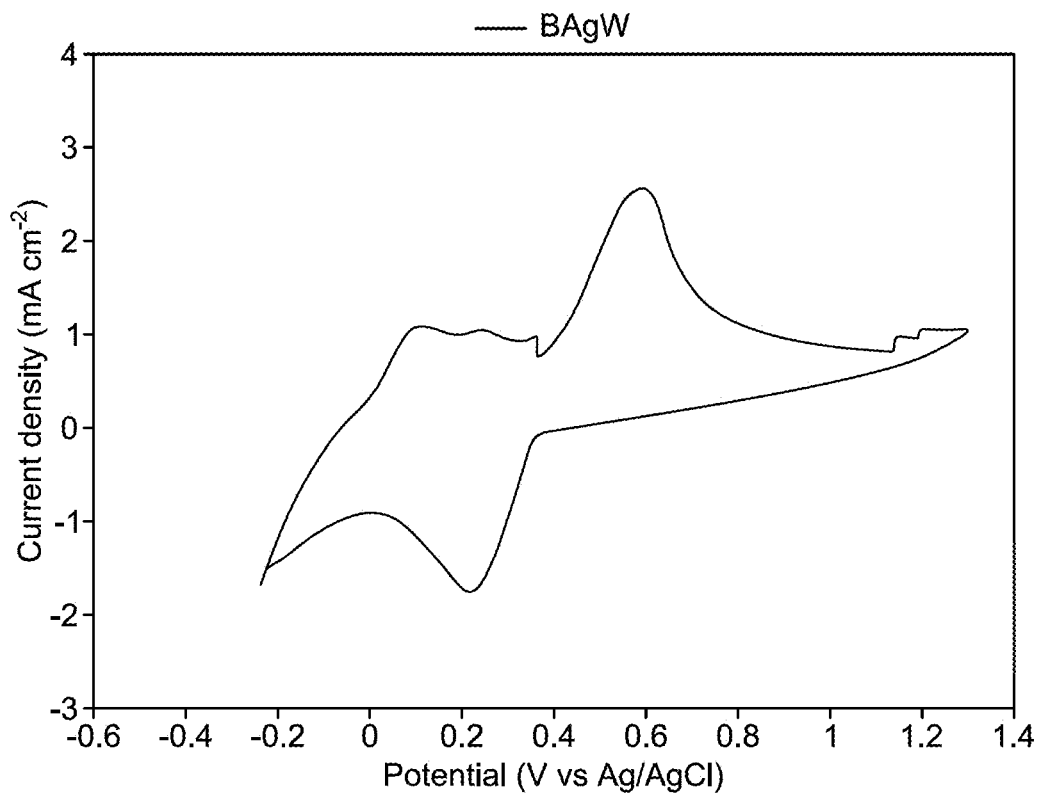
FIG. 6B depicts a typical CV curve for B@AgW employing 0.5 molar (M) sulfuric acid electrolyte, in presence of MeOH, according to certain embodiments.

FIGS. 6A-6B illustrate the typical CVs for the B@AgW in both the presence and absence of MeOH while employing the 0.5 M $H_2SO_4$ electrolyte. In the absence of MeOH, the CV peaks in the hydrogen area (−0.6 to −0.2 V) show the presence of nearby one peak at −0.20 V, which were generated by B@AgW, as shown in FIG. 6A. In contrast to voltammograms with no methanol, those with methanol exhibit a dramatic increase in anodic current, indicating the catalytic oxidation of methanol at the surface of the modified electrode, as shown in FIG. 6B. For B@AgW, the forward oxidation peak indicates low current, equal to 2 mA $cm^{-2}$ at 0.48 V equivalent to 198 mA $g^{-1}$, where the backward peak of current, equal to −6 mA $cm^{-2}$ at 0.3 V, was delivered. It also produces a current density of 11 mA $cm^{-2}$ at the highest oxidation peak at 1.3 V, where it produces two strong peaks in the $H_2$ potential range at −0.48 and −0.76 V, including a current density of 29 mA $cm^{-2}$ and 27 mA $cm^{-2}$, respectively. The latter peaks, which show the inherent activity of the B@AgW electrocatalyst, are connected to two reactive sites for $H_2$ adsorption. The ratio of forward to backward peak current measures the capacity of the anodes to oxidize the accumulated, incompletely oxidized species that have collected on their surfaces. The B@AgW electrocatalyst was found to have the ratio of 1.6. B@AgW electrocatalyst was more efficient at converting MeOH completely into $CO_2$, and it did so at 0.8 V vs. RHE, which is much lower.

Figure 7:
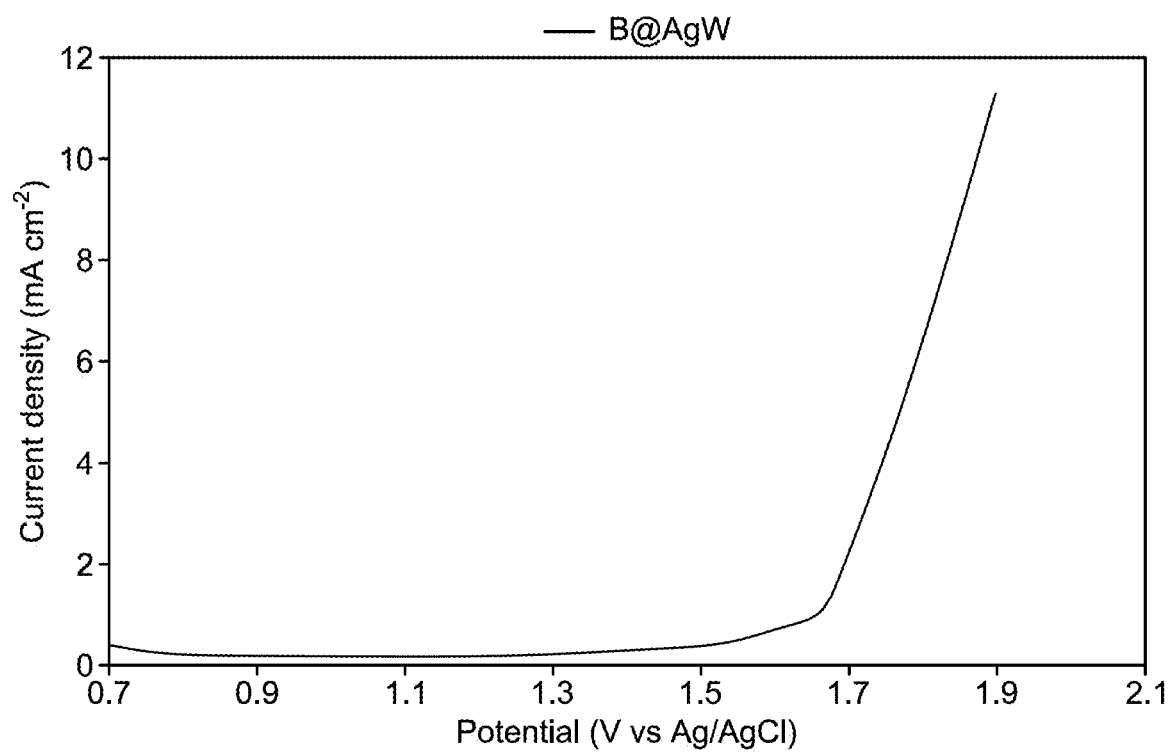
FIG. 7 shows linear sweep voltammetry (LSV) results, conducted in acidic aqueous solution at a scan rate of 10 mV s$^{-1}$, for B@AgW, according to certain embodiments.
Figure 8A:
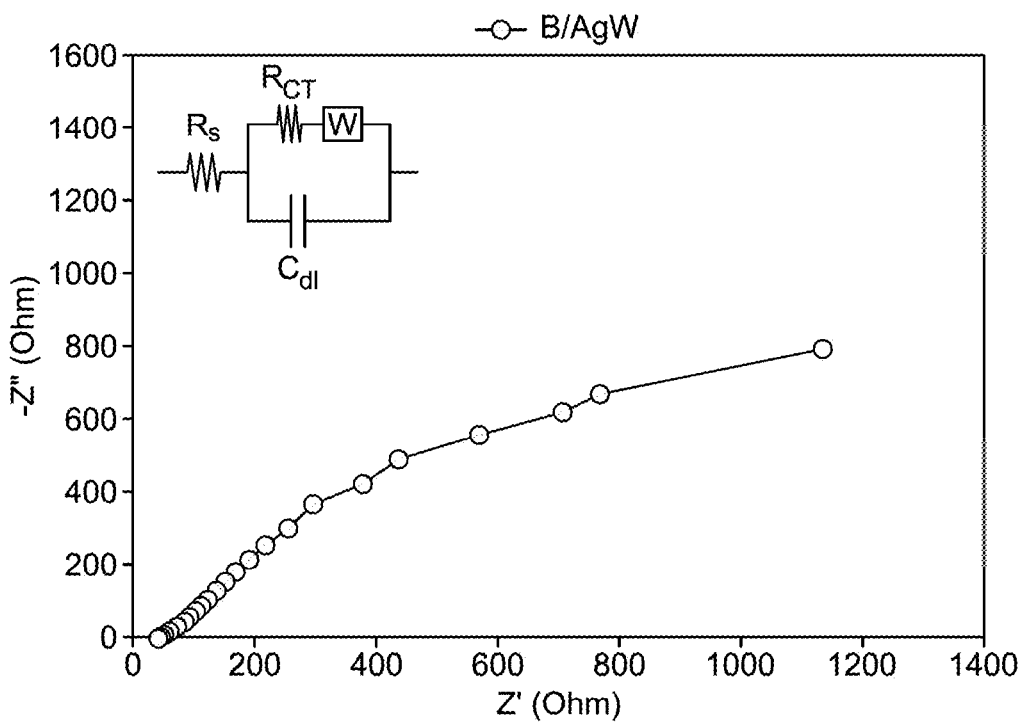
FIG. 8A is a graph depicting Nyquist plots for B@AgW in methanol acidic medium, according to certain embodiments.
Figure 8B:
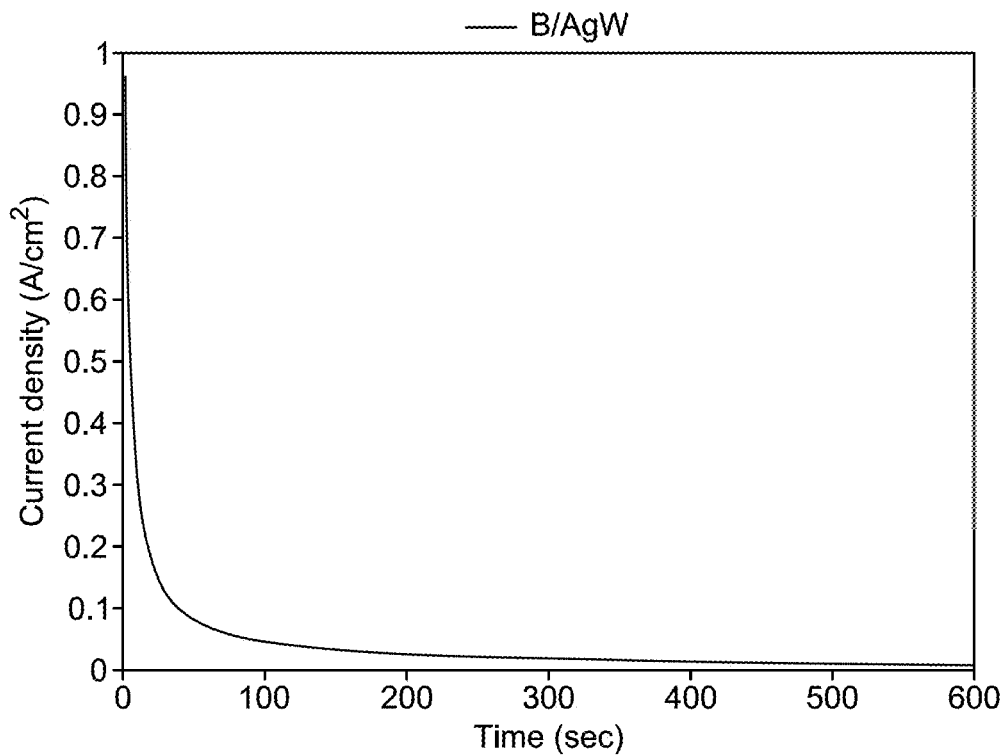
FIG. 8B is a graph depicting CV curve of B@AgW, performed for five cycles under methanol acidic medium, according to certain embodiments.

The present disclosure further includes methanol oxidation LSV curves, as shown in FIG. 7. The B@AgW electrode exhibit increased current density, emphasizing their stimulating effect on the methanol oxidation procedure. The B@AgW electrode, shows the oxidation peak at a potential of 1.82 V, EIS measurements were made at the open circuit potential for each sample in order to evaluate the kinetics of electronic transfer at the electrode/electrolyte interface. EIS Nyquist graphs are shown in FIG. 8A. The semicircle in the high frequency zone relates to the mass transfer activities at the electrode/electrolyte interface and the semicircle in the low-frequency range to the charge-transfer impedance. FIG. 8A shows the EIS of B@AgW that is fitted with an equivalent circuit and includes a bulk solution resistance ($R_s$), a charge transfer resistance ($R_{ct}$), and a pseudocapacitive element ($C_{dl}$) from the $Ag^+$/Ag redox process. Furthermore, the Warburg diffusion (W) impedance explains that the polarization that occurred was influenced by the kinetic and diffusion processes. The B@AgW material exhibited the small semicircular diameter, suggesting that it transports charges most effectively. Compared to bare AgW (370Ω). Assessing the electrocatalyst performance and stability is conducted with the assistance of the chronoamperometric technique. For B-doped AgW, the standard current density vs. time dependence for MOR was determined at 0.2 V and is depicted in FIG. 8B. B@AgW experienced a rapid fall in decay current density, close to 2 mA $cm^{-2}$ after the 600 s.

Example 9: Water Splitting

Electrochemical measurements such as OER and HER, as well as impedance data, were carried out using specialized equipment. The polarization curves in 1.0 M KOH were measured using cycle voltammograms (CV) and LSV. The reference electrode was made of silver/silver chloride (Ag/AgCl), while the counter electrode was a platinum trip with a standard area of 1.0 cm². The previous electrodes were attached to the functioning electrodes (constructed using PVDF) in a compartment containing KOH (1.0 M) solution. All electrochemical data points were I cell x Ru (iR) corrected, and the reversible hydrogen electrode (RHE) was defined as:

$$E_{RHE} = E_{Ag/AgCl} + 0.059 pH + 0.1976.$$

The linear LSV tests were computed at a sweep rate of 5 mV s⁻¹ and the electrical double-layer capacitance was utilized to determine the electro-chemical active surface area (ECSA). The CV tests were performed at various scan speeds of 10 mV s⁻¹, 20 mV s⁻¹, 50 mV s⁻¹, 70 mV s⁻¹, 100 mV s⁻¹, and 150 mV s⁻¹. The EIS evaluations were conducted across the frequency ranging from 100 kHz to 0.01 Hz.

Figure 9:
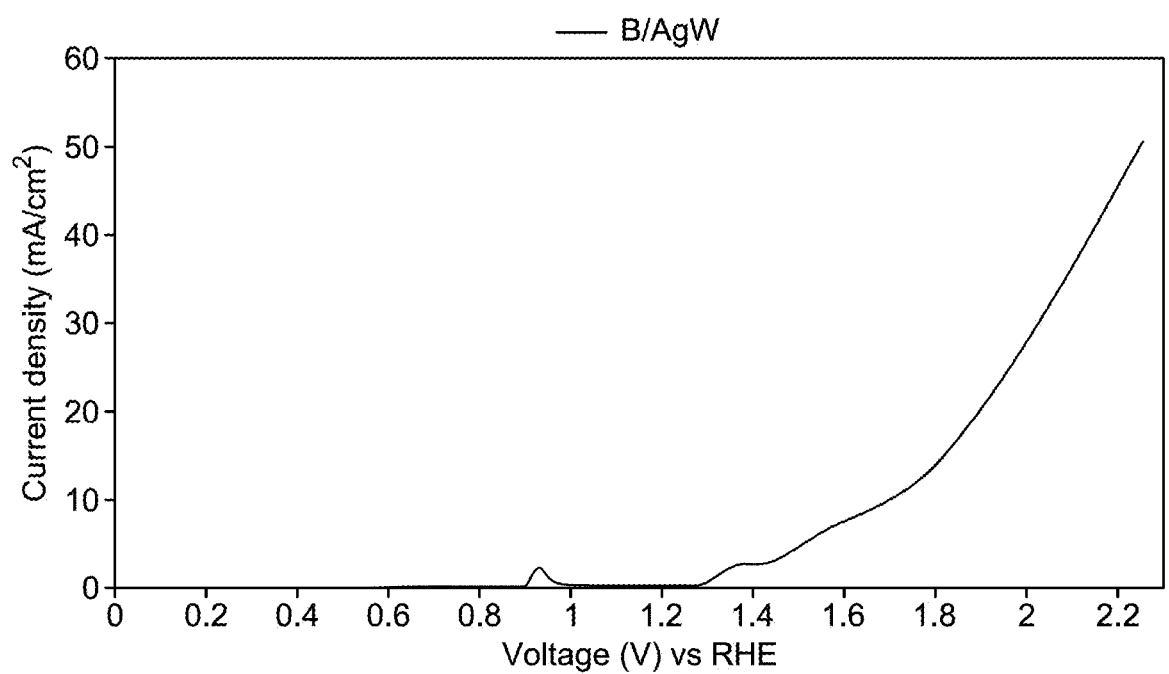
FIG. 9 is a graph depicting polarization curve for oxygen evolution reaction (OER) in 5.0 M KOH, according to certain embodiments.

The OER behaviors of B@AgW sample was examined first in a 5.0 M KOH solution, with a 10% $RuO_2$/AgW included for comparison, as shown in FIG. 9. The LSV trend for the as-made catalyst show minuscule oxidation peaks in the potential voltage range of 1.25 V to 1.4 V, which may have occurred from the oxidation of Ag to $Ag^{1+}$, and $B^{1+}$ to $B^{3+}$, respectively. It is obvious that the B@AgW electrode has the best electrocatalytic activity towards OER, with the smallest overpotential of 399 mV to obtain a current density equal to 10 mA cm⁻² and an excess potential of 0.42 V at a current density of 50 mA cm⁻² as shown in Table 1. At a current density of 10 mA cm⁻², this electrode (B@AgW) has a low potential. As listed in Table 1, the OER activity of B@AgW outperforms that of other comparable electrocatalysts. Further, equation 1 was used to calculate the Tafel data of all electrocatalysts based on measured LSV curves, the results are listed in Table 2.

$$\eta = a + b \log j \quad (1)$$

For the above equation, 'f' is the excess potential, 'j' are the current densities, and 'b' is the slope of the Tafel plot. The electrode B@AgW has the lowest Tafel slope at around 57.5 millivolts per decade (mV dec⁻¹) when compared to the other electrodes, with the exception of $RuO_2$/AgW, which has a value of 48.7 mV/dec. Subsequently, B@AgW exhibited the fastest electron transport and was more kinetically advantageous than the other tested electrodes. This hypothesis proposes that the oxygen generation process in the basic medium, which is a half-reaction of water splitting that occurs at the anode, occurs in a four-step pathway. This is proposed by forming metal hydroxide in the basic medium, which in turn forms metal oxide as well as oxyhydroxide, which ultimately forms metal and evolves $O_2$ at the anode as follows:

$$M + OH^- \rightarrow M\text{-}OH \quad (2)$$

$$M\text{-}OH + OH^- \rightarrow MO + H_2O \quad (3)$$

$$MO + OH^- \rightarrow MOOH + e^- \quad (4)$$

$$MOOH \rightarrow M + O_2 + H^+ \quad (5)$$

Figure 10:
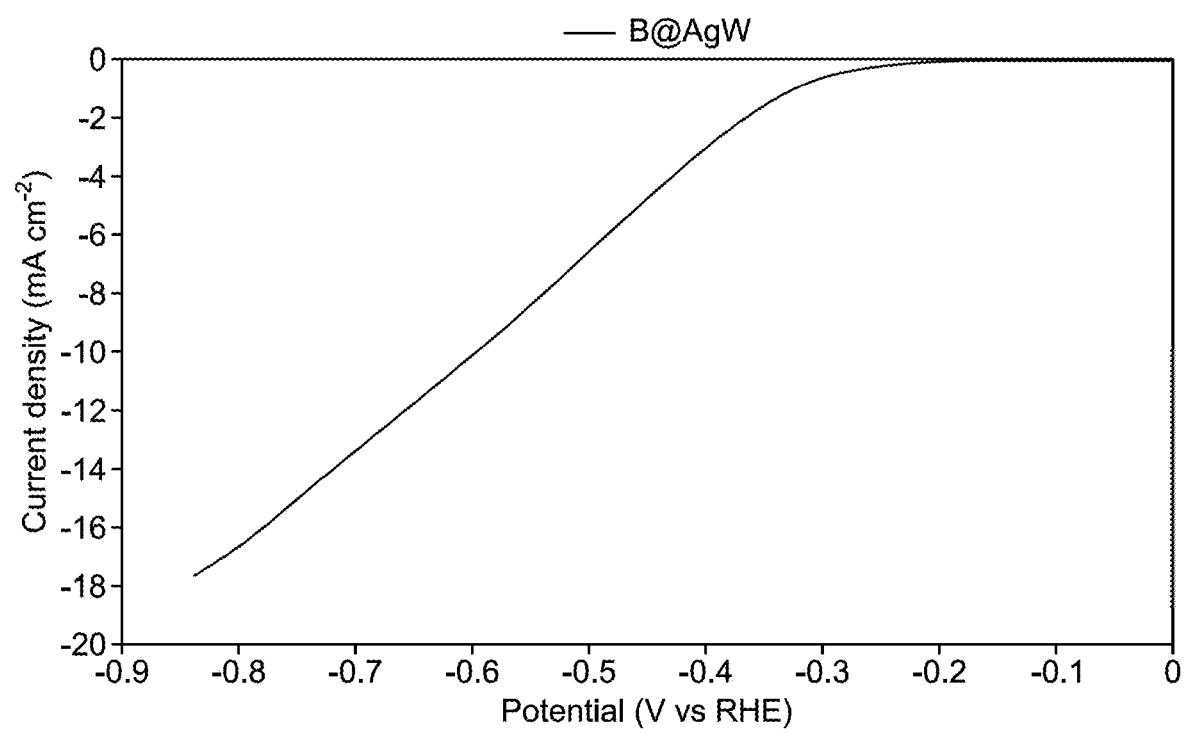
FIG. 10 is a graph depicting polarization curve for hydrogen evolution reaction (HER) in 5.0 M KOH on B@AgW, measured with a scan rate of 10 mV/s, according to certain embodiments.

Concurrently, the exchange current density was measured. The exchange current energy values of different electrodes were in the following order, B@AgW (29.2× 10⁻³ A cm⁻²)>AgW (0.43×10⁻³ A cm⁻²). It may be noted from the above results that B-doped AgW possess more active sites on their surfaces. B@AgW has the strongest OER performance due to its smaller crystallite sizes and higher conductivity, further on top of having a high ECSA value, B@AgW also has a shortage of active sites and low boron percentages. In addition to the desirable performance of the B@AgW, it also has high HER performance in terms of decreasing the overpotential. FIG. 10 depicts the LSV graphs of B@AgW electrode in a 5.0 M KOH solution, along with a comparison curve of 10% Pt/C. The former electrode has an overpotential of −340 mV at a current density of 10 mA cm⁻². At the identical current density, the other electrodes have higher overpotentials as shown in Table 1.

TABLE 1

Electrochemical kinetic parameters of all catalysts towards hydrogen and oxygen evolution in 5.0M KOH

| Samples | Onset $H_2$ (V) | $\eta_{-10}$ (V) | Onset $O_2$ (V) | $\eta_{10}$ (V) | ECSA (mF) |
|---|---|---|---|---|---|
| 10% $RuO_2$/AgW | | | 0.28 | 0.244 | |
| Pt/C | −0.54 | −0.8 | | | |
| AgW | −0.22 | −0.42 | 0.84 | 0.525 | 4.3 |
| B@AgW | −0.01 | −0.34 | 0.74 | 0.399 | 11.9 |

The Tafel data, as shown in Table 2, reveal the electrocatalytic characteristics of all materials towards HER. B@AgW has a Tafel slope of 111.3 mV/dec, which is somewhat lower than AgW (117.4 mV/dec), as shown in Table 2. The Tafel values of the modified AgW catalysts represent their Volmer-Heyrovsky strategy during the HER process, with the adsorption and desorption of H intermediates determining the reaction rate. In such alkaline conditions, the Volmer and Heyrovsky processes include the hydroxide ion, although the Tafel step stays intact, as described using equations 6 and 7.

$$H_2O + e^- + M \rightarrow M\text{-}H + OH^- \quad (6)$$

$$H_2O + e^- + M\text{-}H \rightarrow H_2 + OH^- \quad (7)$$

Figure 11:
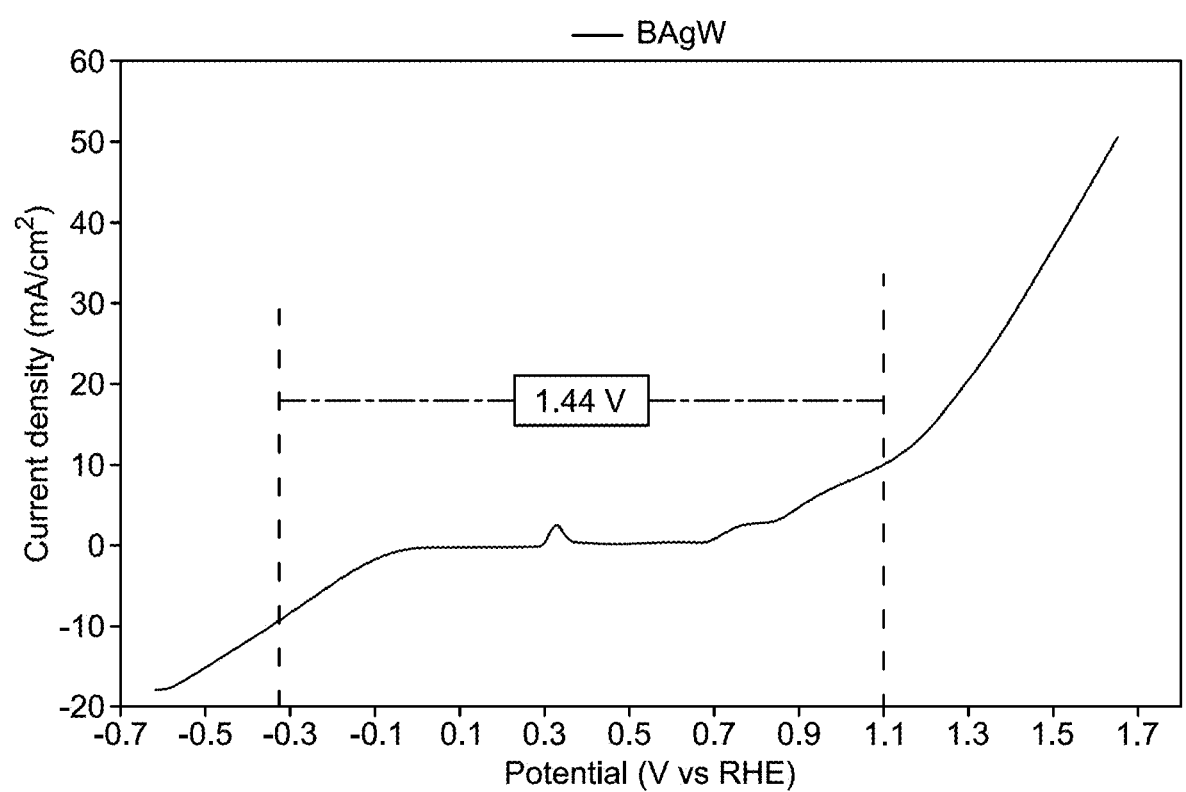
FIG. 11 is a graph illustrating LSV curves, showing HER and OER processes on B@AgW in 5.0 M KOH, measured with a scan rate of 10 mV/s, according to certain embodiments.

Because of the significance of both OER and HER activities, the B@AgW electrode might be used as a dual-functional electrocatalyst for the overall splitting of water in alkaline environments. FIG. 11, depicts the overall water splitting performance of a two-electrode system in a 5.0 M KOH solution made of B@AgW electrocatalysts as both anode and cathode. As can be seen from FIG. 11, low cell voltage of 1.44 V may be achieved at an average current density of 10 mA cm² which is smaller than other cells.

TABLE 2

Slopes of Tafel oxidation and reduction reactions

| Samples | Cathodic Tafel Slope (mV/decade) | Anodic Tafel Slope (mV/decade) | $I_o$ geometric (A cm⁻²) |
|---|---|---|---|
| Pt/C | 122.9 | | — |
| $RuO_2$/AgW | | 48.7 | — |
| AgW | 117.4 | 98.1 | 0.43 × 10⁻³ |
| B@AgW | 111.4 | 57.6 | 29.2 × 10⁻³ |

The present disclosure provides the method for water electrolysis. Also, the present disclosure proposes an efficient and effective method to create a wide range of non-metal-incorporated materials, including $\alpha$-$Ag_2WO_4$ and $\beta$-$Ag_2WO_4$. The present disclosure aims to increase the number of active sites and enhance the intrinsic catalytic activity, while also addressing any crystal assembly imperfections that may hinder these improvements and overcome any associated drawbacks. Therefore, properties of α-$Ag_2WO_4$/β-$Ag_2WO_4$ electrocatalysts are studied herein, including synthesis, electrochemical characteristics, methanol oxidation, oxygen evolution reaction, and hydrogen evolution reactions. In addition, effects of doping with boron using the cationic surfactant cetyltrimethylammonium bromide (CTAB) was also examined as a template to control the formation of the α-$Ag_2WO_4$ and β-$Ag_2WO_4$ polymorphs.

Numerous modifications and variations of the present disclosure are possible in light of the above teachings. It is therefore to be understood that within the scope of the appended claims, the invention may be practiced otherwise than as specifically described herein.

The invention claimed is:

1. A method for water electrolysis, the method comprising:
applying a voltage to an aqueous solution in an electrochemical cell comprising a working electrode at least partially coated with a catalyst composition comprising boron-doped $Ag_2WO_4$ nanoparticles, wherein the amount of boron present in the boron-doped $Ag_2WO_4$ nanoparticles is in a range from 5 to 35 wt. % of the total weight of the boron-doped $Ag_2WO_4$ nanoparticles,
wherein during the applying hydrogen evolves from the aqueous solution due to a hydrogen evolution reaction and oxygen evolves from the aqueous solution due to an oxygen evolution reaction, and
wherein the working electrode during the applying has an overpotential of less than or equal to 500 mV at a current density of 10 mA·cm$^{-2}$ for the oxygen evolution reaction.

2. The method of claim 1, wherein the amount of boron present in the boron-doped $Ag_2WO_4$ nanoparticles is in a range from 10 to 30 wt. % of the total weight of the boron-doped $Ag_2WO_4$ nanoparticles.

3. The method of claim 2, wherein the amount of boron present in the boron-doped $Ag_2WO_4$ nanoparticles is in a range from 15 to 25 wt. % of the total weight of the boron-doped $Ag_2WO_4$ nanoparticles.

4. The method of claim 1, wherein the boron-doped $Ag_2WO_4$ nanoparticles have α-$Ag_2WO_4$ and β-$Ag_2WO_4$ crystallites and the percentage of β-$Ag_2WO_4$ crystallites is in a range from 1 to 28% of the total number of crystallites.

5. The method of claim 4, wherein the percentage of β-$Ag_2WO_4$ crystallites is in a range from 6 to 23% of the total number of crystallites.

6. The method of claim 5, wherein the percentage of β-$Ag_2WO_4$ crystallites is in a range from 8 to 18% of the total number of crystallites.

7. The method of claim 1, wherein the working electrode during the applying has an overpotential of less than or equal to 450 mV at a current density of 10 mA·cm$^{-2}$ for the oxygen evolution reaction.

8. The method of claim 7, wherein the working electrode during the applying has an overpotential of less than or equal to 425 mV at a current density of 10 mA·cm$^{-2}$ for the oxygen evolution reaction.

9. The method of claim 1, wherein the working electrode during the applying has an overpotential of less than or equal to −450 mV at a current density of 10 mA·cm$^{-2}$ for the hydrogen evolution reaction.

10. The method of claim 9, wherein the working electrode during the applying has an overpotential of less than or equal to −400 mV at a current density of 10 mA·cm$^{-2}$ for the hydrogen evolution reaction.

11. The method of claim 10, wherein the working electrode during the applying has an overpotential of less than or equal to −375 mV at a current density of 10 mA·cm$^{-2}$ for the hydrogen evolution reaction.

12. The method of claim 1, wherein the electro-chemical active surface area during the applying is greater than or equal to 6 mF·cm$^{-2}$.

13. The method of claim 12, wherein the electro-chemical active surface area during the applying is greater than or equal to 8 mF·cm$^{-2}$.

14. The method of claim 13, wherein the electro-chemical active surface area during the applying is greater than or equal to 10 mF·cm$^{-2}$.

15. The method of claim 1, wherein the aqueous solution comprises 5.0 M KOH.

16. The method of claim 1, wherein the anodic Tafel slope during the applying is less than or equal to 100 mV/decade.

17. The method of claim 16, wherein the anodic Tafel slope during the applying is less than or equal to 80 mV/decade.

18. The method of claim 17, wherein the anodic Tafel slope during the applying is less than or equal to 50 mV/decade.

19. The method of claim 1, wherein the cathodic Tafel slope during the applying is less than or equal to 120 mV/decade.

20. The method of claim 19, wherein the cathodic Tafel slope during the applying is less than or equal to 114 mV/decade.

* * * * *